US006961332B1

(12) United States Patent
Li et al.

(10) Patent No.: US 6,961,332 B1
(45) Date of Patent: Nov. 1, 2005

(54) MULTIPLE APPEARANCE DIRECTORY NUMBER SUPPORT ACROSS PACKET- AND CIRCUIT-SWITCHED NETWORKS

(75) Inventors: Xuewen Li, Cary, NC (US); Carroll L. Gray-Preston, Morrisville, NC (US); Samuel H. Christie, IV, Cary, NC (US); Junhui Ma, Cary, NC (US)

(73) Assignee: Nortel Networks Limited, St. Laurent (CA)

( * ) Notice: Subject to any disclaimer, the term of this patent is extended or adjusted under 35 U.S.C. 154(b) by 925 days.

(21) Appl. No.: 09/842,298

(22) Filed: Apr. 25, 2001

(51) Int. Cl.[7] ............................................. H04L 12/66
(52) U.S. Cl. ...................................... 370/352; 370/401
(58) Field of Search ................................ 370/352, 401, 370/493; 379/221.01, 156; 709/223

(56) References Cited

U.S. PATENT DOCUMENTS

| | | | | |
|---|---|---|---|---|
| 5,204,861 | A * | 4/1993 | Wiebe ........................... | 379/156 |
| 6,363,065 | B1 * | 3/2002 | Thornton et al. ............. | 370/401 |
| 6,836,478 | B1 * | 12/2004 | Huang et al. ................ | 370/352 |
| 2004/0133641 | A1 * | 7/2004 | McKinnon et al. .......... | 709/223 |

OTHER PUBLICATIONS

Toga, James and Ott, Jörg, "ITU-T Standardization Activities for Interactive Multimedia Communications on Packet-Based Networks: H.323 and Related Recommendations," Computer Networks, No. 31, pp. 205-223, 1999, XP-000700319.

Hamdi, Maher et al, "Voice Service Interworking for PSTN and IP Networks," IEEE Communications Magazine, May 1999, XP000830888.

"A Primer on the H.323 Series Standard," DataBeam Corporation, 1997, 1998, http://www.lotus.com/products/sametime.nsf/Menu/PDF/$FILE/h323_primer-v2.pdf.

* cited by examiner

*Primary Examiner*—Duc Ho
*Assistant Examiner*—Phuongchau Ba Nguyen
(74) *Attorney, Agent, or Firm*—Withrow & Terranova, PLLC

(57) ABSTRACT

The present invention provides for a multiple appearance directory number (MADN) group including terminals on both the public switched telephone network (PSTN) and a packet-switched network. The terminals within the MADN group are preferably on the PSTN and a packet-switched network under the control of the PSTN. While call signaling is centralized and provided by the PSTN, a full complement of PSTN services are available to the terminals on the packet-switched network. With centralized call control and access to services from the PSTN, IP terminals on the packet-switched network are treated as if they were PSTN terminals by PSTN elements, and are capable of implementing PSTN features and functions.

28 Claims, 15 Drawing Sheets

MULTIPLE APPEARANCE DIRECTORY NUMBER SUPPORT ACROSS PACKET- AND CIRCUIT-SWITCHED NETWORKS

FIELD OF THE INVENTION

The present invention relates in general to providing multiple appearance directory number support, and in particular, to providing such support for terminals in packet- and circuit-switched networks.

BACKGROUND OF THE INVENTION

The public switched telephone network (PSTN), with its impressive coverage, reliability and ease of use, is the reference standard in voice communications and related services. Users have grown to expect a dial tone every time a phone is taken off-hook, and to be connected to a dialed party in a quick and efficient manner over a high quality connection. Users are not only accustomed to, but demand, residential and business services, such as caller identification, call forwarding, and call waiting. The PSTN and its related services are being further extended at a rapid rate by wireless networks.

Although the circuit-switched networks of the PSTN and wireless networks dominate voice communications, there is an increasing market to provide voice and related services over packet-switched networks, such as the Internet. These voice and related services provided over packet-switched networks are typically referred to as IP telephony. Given the extended coverage of the PSTN and wireless networks, there is a need to have these networks interact with packet-switched networks to provide seamless communications between users on the respective networks.

The PSTN can provide business and customer groups across multiple agent types within the PSTN infrastructure. For example, a customer group may include all subscribers in one building on a large company's campus. Traditionally, all of the members within the customer group are supported using a common telephony infrastructure. Although these customer groups may be connected to packet-switched networks through existing gateways, subscribers on the different networks cannot coexist in a common business group. Within a given business group, it is often preferable to define and support multiple appearance directory number (MADN) groups, wherein multiple terminals share a common directory number.

MADN terminals are generally supported by a common switch. For incoming calls directed to the MADN group using the common directory number, the terminals are controlled to ring at the same time, any terminal within the MADN group can answer the call. The first terminal to answer receives the call; however, other members within the MADN group may subsequently join the call. Unfortunately, MADN groups are only supported in the PSTN. As such, MADN groups may not include packet-switched terminals supporting IP telephony. Further, the inability to support packet-switched terminals eliminates the opportunity to support mobility within a MADN group without reconfiguring infrastructure.

Unfortunately, IP telephony has been plagued with unreliable connections, poor quality of service, and limited services as compared to the PSTN. Call signaling and related provisioning are typically provided separately within the various networks, resulting in inefficient operation and limited or incompatible services between the networks. As such, there is a need for a way to support MADN groups including packet- and circuit-switched terminals within the same group.

There is also a need for a way to support IP telephony by the PSTN wherein telephony terminals on the PSTN or packet-switched network appear the same to users and can access and support a complete set of business or residential services normally supported by the PSTN. Further, there is a need to provide these services to IP terminals in an efficient manner while minimizing the impact on the PSTN entities providing for voice communications and related services.

SUMMARY OF THE INVENTION

The present invention provides for a multiple appearance directory number (MADN) group including terminals on both the public switched telephone network (PSTN) and a packet-switched network. The terminals within the MADN group are preferably on the PSTN and a packet-switched network under the control of the PSTN. While call signaling is centralized and provided by the PSTN, a full complement of PSTN services are available to the terminals on the packet-switched network. With centralized call control and access to services from the PSTN, IP terminals on the packet-switched network are treated as if they were PSTN terminals by PSTN elements, and are capable of implementing PSTN features and functions.

Preferably, the packet-switched terminals or the terminal proxy servers controlling the packet-switched terminals are capable of sending status messages to other terminals in the MADN group upon occurrence of a MADN event. The status messages operate to keep the packet-switched terminals informed of the status of a call involving the MADN group or status of a terminal within the MADN group. For example, when a packet-switched terminal is originating a call, a key setup status message indicating that a call is being originated is sent to the other PSTN and packet-switched terminals in the same MADN group. When an incoming call is directed to the MADN group and answered by one of the packet-switched terminals, a key hold status message indicating the same is sent to the other PSTN and packet-switched terminals.

Preferably, a gateway is provided to facilitate communications between the PSTN and the packet-switched network. The packet-switched network will include a packet-switched terminal or a terminal proxy server supporting the packet-switched terminal. A gatekeeper is provided on the packet-switched network to facilitate call signaling between the gateway and the packet-switched terminal or terminal proxy server. Further, the gatekeeper cooperates with the gateway to effectively extend call signaling from the PSTN to the terminal or terminal proxy server.

The gateway terminates a PSTN interface, which maps a virtual loop identifier to the terminal. The virtual loop identifier (or "loop TID"), is associated with a logical terminal identifier, such as a directory number, and is provided to the gatekeeper. The gatekeeper maintains an association between the virtual loop identifier, the logical terminal identifier, and an actual address of the terminal or terminal proxy server for call signaling.

Call signaling messages originating from the terminal or terminal proxy server are routed to the gateway via the gatekeeper. The gatekeeper preferably inserts the virtual loop identifier into the call signaling messages so that the gateway can effectively identify the terminal to the PSTN. Call signaling concepts between protocols used in the PSTN and those used in the packet-switched network are mapped to one another as much as possible. Additional PSTN concepts, in particular, call feature activators and indicators, are tunneled between the gateway and the terminal or terminal proxy server inside the call signaling messages, unbeknownst to the gatekeeper.

Preferably, the PSTN interface is an integrated services digital network (ISDN) basic rate interface, and the packet-switched network uses the H.323 call signaling suite of protocols. The virtual loop identifier and the call feature activators and indicators may be carried within a user-to-user information element (UUIE) in the H.323 messages between the various components in the packet-switched network.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The present invention provides for a multiple appearance directory number (MADN) group including terminals on both the public switched telephone network (PSTN) and a packet-switched network. The PSTN and terminals within the MADN group are preferably on a packet-switched network under the control of the PSTN. While call signaling is centralized and provided by the PSTN, a full complement of PSTN services are available to the terminals on the packet-switched network. With centralized call control and access to services from the PSTN, IP terminals on the packet-switched network are treated as if they were PSTN terminals by PSTN elements, and are capable of implementing PSTN features and functions.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Prior to describing the operation of the present invention, a preferred technique for controlling IP terminals from the PSTN as well as providing PSTN services to the IP terminals is described in detail. Although the present invention is applicable to various types of network and network interfaces of the PSTN, the preferred embodiment of the present invention relates to a basic rate interface (BRI) of an integrated services digital network (ISDN). As such, a virtual ISDN basic rate interface of the PSTN is assigned to each IP terminal on a packet-switched network. The interface is virtual in the sense that an ISDN interface with a terminal is emulated. Media flow, call signaling and PSTN services are provided to the IP terminal by the existing PSTN in a manner such that the PSTN does not have to distinguish between traditional PSTN terminals and IP terminals supported by the PSTN.

Figure 1A:
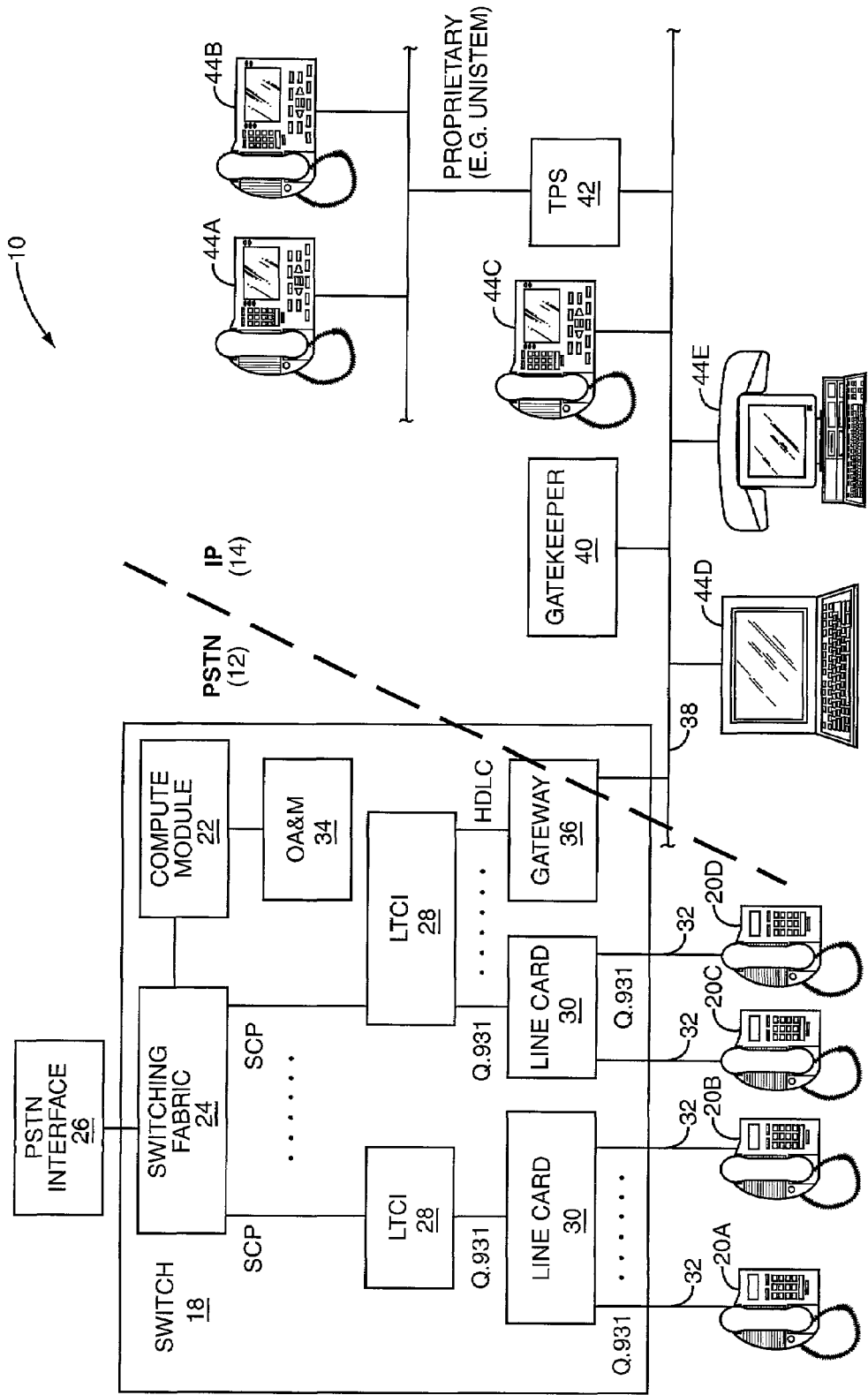
FIG. 1A is a block representation of the communications environment of the present invention.

FIG. 1A illustrates a basic telecommunication network 10, providing for the interworking between the PSTN 12 and a packet-switched network, such as IP network 14. A MADN group 16 (see FIG. 1B) according to the present invention will incorporate elements from each of these networks 12, 14. A PSTN switch 18, such as a signal switching point (SSP) in an SS7 network, supports circuit-switched communications between PSTN terminals 20(A–D) in traditional fashion. The switch 18 may be a local exchange switch, such as the DMS-100 local switching system manufactured by Nortel Networks Limited, World Trade Center of Montreal, 8$^{th}$ Floor, 380 St. Antoine Street West, Montreal, Quebec H2Y 3Y4, Canada. The switch 18, such as the DMS-100, will typically include a compute module 22 including sufficient software and access to databases to control operation and function of the switch 18. A "switching fabric" module 24 may provide logical or physical switches for interconnecting the various subscriber lines 32 serving the PSTN terminals 20 to each other or to other switches in the PSTN 12 via a PSTN interface 26. The switch 18 will preferably include an operations, administration and maintenance (OA&M) module 34, which provides an interface for select service and upgrade activities.

Typically, the switching fabric 24 is coupled to the respective PSTN terminals 20 through a line trunk card interface 28 and line cards 30. As noted, the preferred embodiment of the invention provides an ISDN basic rate interface for supported terminals. Thus, the line cards 30 are configured to support an ISDN basic rate interface and to interact with PSTN terminals 20 configured to interact with such an interface. The ISDN basic rate interface provides full digital access to the PSTN 12 from the PSTN terminals 20. When using ISDN, call signaling between the PSTN 12 and the PSTN terminals 20 is provided using the Q.931 protocol. Signaling within the digital core of the PSTN 12 uses SS7. Additional details relating to Q.931 may be found in ITU-T Recommendation Q.931, "ISDN User-Network Interface Layer Three Specification for Basic Call Control," 1993, which is incorporated herein by reference in its entirety.

Typically, Q.931 is used for call signaling between the switch 18 and the PSTN terminals 20. A signaling control protocol (SCP) is used for communications within the switch and between the LTCIs 28 and the switching fabric 24 or compute module 22. Those skilled in the art should have a clear understanding of the basic interworkings of the PSTN 12 in relation to an ISDN basic rate interface.

To interact with the IP network 14, the switch 18 preferably includes or is otherwise associated with a gateway 36. The gateway 36 is configured to translate call signaling and media content traveling between the PSTN 12 and IP network 14. Preferably, the gateway 36 is provisioned as one or more ISDN basic rate interfaces corresponding to individual, virtual telephone loops. Thus, entities within the IP network 14 recognized by the PSTN 12 will appear as terminals connected to an ISDN basic rate interface.

As depicted, the gateway 36 is connected to a packet-switched network, such as a local area network (LAN) 38. The LAN 38 is preferably configured to support IP telephony roughly according to the ITU's H.323 standard. Additional information pertaining to the H.323 and related standards for packet-based multimedia communications may be found in Computer Networks and ISDN Systems' "ITU-T standardization activities for interactive multimedia communications on packet-based networks: H.323 and related recommendations," volume 31, no. 3, pages 205–223; and also in ITU-T recommendations H.323, "Packet-Based Multimedia Communications Systems," 1998, H.225.0, "Call Signaling Protocols and Media Stream Packetization for Packet-Based Multimedia Communication Systems," 1998, H.245, "Control Protocol for Multimedia Communications," 1998, and H.450.1, "Generic Functional Protocol for Support of Supplementary Services and H.323," 1998, the disclosures of which are incorporated herein by reference.

The LAN 38 preferably includes a gatekeeper 40 and a terminal proxy server (TPS) 42. Various IP terminals 44(A–E) may be directly or indirectly connected to the LAN 38. Notably, the TPS 42 may act to support IP terminals 44A and 44B, which require the services of the TPS 42 to control functionality and facilitate communications, including call flow and call signaling. The IP terminals 44C–44E may be self-sufficient and capable of communicating with devices on the LAN 38 without the assistance of a TPS 42. The TPS 42 will typically communicate with IP terminals 44A and 44B using a proprietary protocol, such as Nortel Networks Limited's UNISTEM protocol.

Figure 1B:
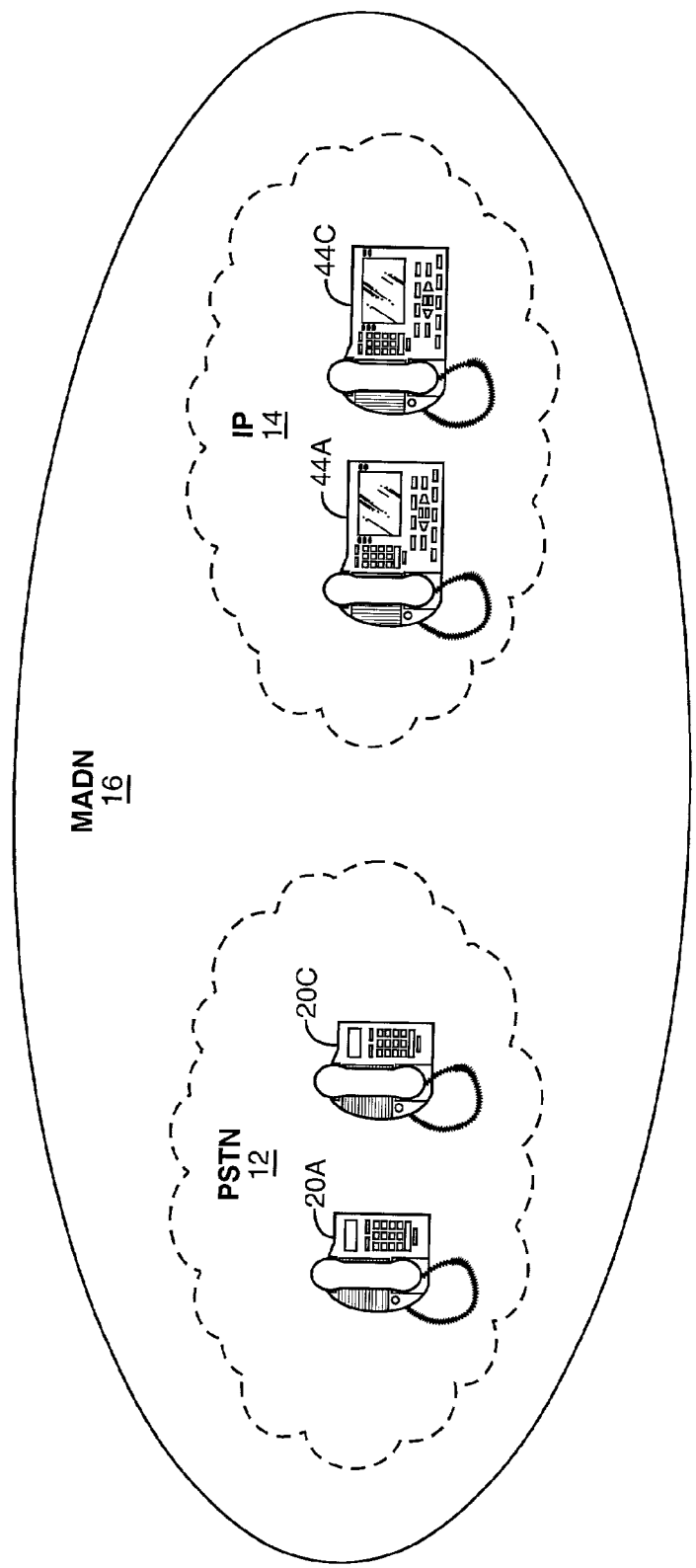
FIG. 1B illustrates a MADN group including PSTN and IP terminals according to the preferred embodiment of the present invention.

For the present invention, the MADN group 16 may include elements from the PSTN 12 and the IP network 14. For the purposes of illustrating the present invention, FIG. 1B illustrates the MADN group 16 as having terminals 20A and 20C from the PSTN 12 and IP terminals 44A and 44C from the IP network 14. As such, terminals 20A and 20C and IP terminals 44A and 44C will share a common directory number. Preferably, all the terminals will support a full complement of PSTN services, and in particular, cooperate as a MADN group 16. The general characteristics of a MADN group require that all the terminals ring when their common directory number is dialed. The call may be answered by any one of terminals in the MADN group 16. The first terminal answered receives the call. Preferably, other terminals may join or exit a call as desired.

Communications between the gateway 36, gatekeeper 40, TPS 42, and IP terminals 44C–44E are generally governed by the H.323 standard, as modified by the present invention. If the IP terminals 44 are supported by a TPS 42, the TPS 42 may terminate call signaling and further convert the requisite commands to a proprietary or other protocol to control the dedicated IP terminals 44 associated therewith. If the IP terminals 44 are self-sufficient and do not require the services of a TPS 42, the call signaling may be directly terminated by the IP terminals 44. For the purposes of discussion, the use of "IP terminal 44" encompasses a TPS 42 supporting terminals and acting as an H.323 endpoint for those terminals.

The H.323 standard defines three primary entities: a gatekeeper, a gateway, and terminals. For the present invention, the TPS 42 acts as an H.323 terminal to the network on behalf of the non-H.323 terminals that the TPS 42 supports. The gatekeeper 40 provides call control services for the H.323 terminals (which includes the TPS 42). These call control services may include address translation, admission control, call authorization, and directory services. The registration, admission, and status (RAS) protocol defined in H.225.0 is used to communicate between the gatekeeper 40 and the H.323 terminals. The gateway 36 is configured to translate media and call signaling between the IP network 14 and the ISDN basic rate interface provided by the PSTN 12. Additional information relating to the H.323 standard may be found in "Voice Service Interworking for PSTN and IP Networks," IEEE Communications Magazine, May 1999, which is incorporated herein by reference in its entirety.

Figure 2:
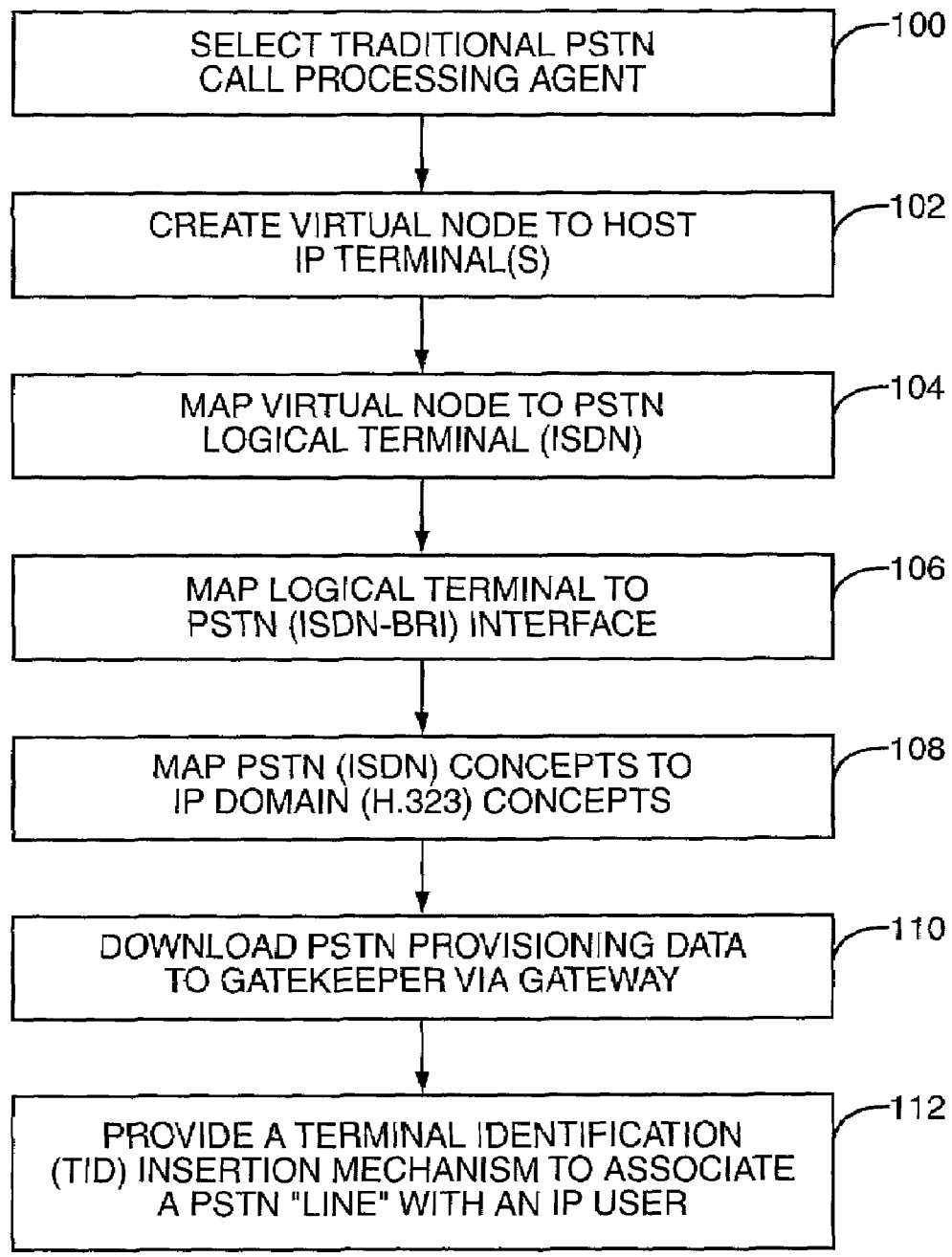
FIG. 2 is a flow diagram outlining the overall setup and implementation of a preferred embodiment of the present invention.

The architecture of FIG. 1 provides the necessary hardware to enable a full set of business and telephony services to be delivered to an IP terminal 44 by leveraging the existing infrastructure and services provided by the PSTN 12. Preferably, the concepts of an ISDN basic rate interface and the H.323 protocols are integrated in a fashion that eliminates the need to develop new business and residential services from scratch in the IP domain. The underlying concepts for controlling the IP terminals 44 from the PSTN 12 and providing PSTN services to the IP terminals 44 are outlined in the flow diagram of FIG. 2.

Initially, a traditional call processing agent, such as that associated with the ISDN basic rate interface, is selected to integrate into the IP network 14 (block 100). Next, a virtual node is created in the PSTN 12 to host the IP terminals 44 (block 102). By creating the virtual node, the services and call processing software of the PSTN 12 do not need to know that the services are presented to an IP terminal 44 (or TPS 42 acting on behalf of the IP terminal 44), as opposed to a traditional terminal, such as the PSTN terminals 20. Creating a virtual node also eliminates the need to change existing node maintenance software already present in the PSTN 12. Next, the virtual node is mapped to a logical (ISDN) terminal (block 104), which is further mapped to an ISDN basic rate interface (block 106). Thus, the IP terminals 44, via the virtual node created by the PSTN 12, are logically connected to the PSTN 12. As discussed in greater detail below, the gateway 36 facilitates this connection and interaction.

Assuming an ISDN-to-H.323 interface in the gateway 36, the present invention preferably eliminates the ISDN basic rate interface restriction of having two B channels. In the PSTN 12, the ISDN basic rate interface only supports two B channels. In the IP domain, the B channel can be thought of as a real time protocol (RTP)/user datagram protocol (UDP) session since speech is no longer carried out in a Time Division Multiplex (TDM) format, but rather in packets according to the real time protocol. As such, there is no need for the ISDN's maximum two B channel per Interface limitation in the IP domain.

Next, PSTN services concepts are mapped to IP domain concepts (block 108). For example, ISDN's call reference may be mapped to H.323's call reference value (CRV), and the telephony node and terminal numbers may be mapped to an endpoint ID (EID), additional information on which follows. Next, the PSTN 12 downloads provisioning data to the gatekeeper 40 via the gateway 36 (block 110). Preferably, the provisioning data is maintained using a flat file database, which eliminates the need for commercial database licensing fees and royalty charges.

Finally, a mechanism is provided to efficiently identify the IP terminals 44 to the gateway 36, such that the gateway 36 can effectively associate the IP terminal 44 with a specific ISDN basic rate interface (block 112). Typically, each virtual telephone loop associated with an ISDN basic rate interface is associated with an identifier, commonly referred to as a loop terminal identifier (TID). With a normal ISDN basic rate interface, each loop may include multiple PSTN terminals 20, each associated with a terminal endpoint identifier (TEI). These PSTN terminals 20 typically include keys, which are further associated with a key identifier, commonly referred to as VIDs. These various identifiers, the loop TID, TEI, and VID, may be used to respectively identify the virtual telephone loop, the terminal within the loop, and a key pressed within the loop to the switch 18.

Figure 3:
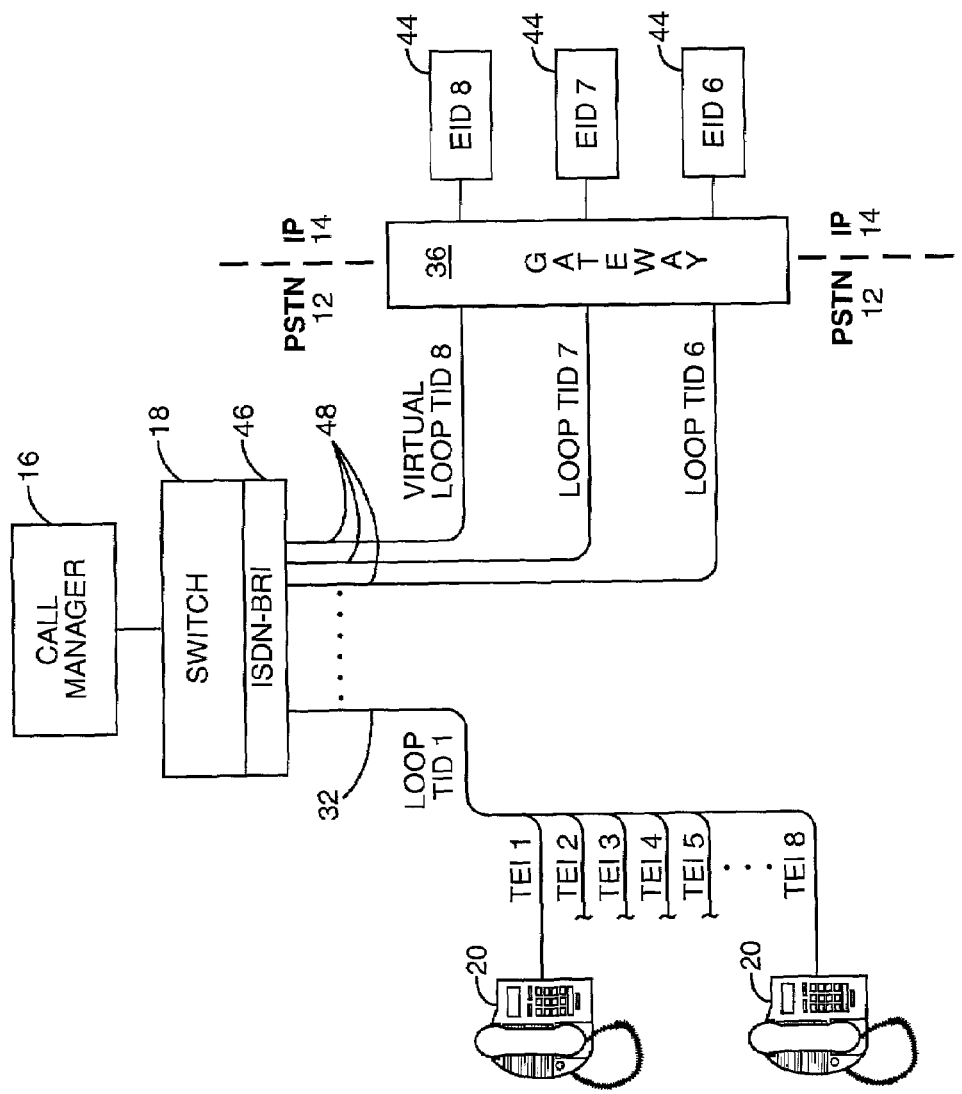
FIG. 3 is a logical illustration of select concepts according to a preferred embodiment of the present invention.

An ISDN basic rate interface 46 is effected to support virtual loops 48 as shown in FIG. 3. These virtual loops 48 terminate at the gateway 36 and are each associated with an IP terminal 44. Preferably, the virtual loops 48 are identified using a loop TID, and the IP terminals 44 are identified using an EID, as illustrated. In operation, the switch 18 provides call signaling and PSTN services to PSTN terminals 20 and IP terminals 44 in a uniform manner. When a switch 18 identifies a loop TID, the switch 18 will treat any terminal connected to the actual loop 32 or virtual loop 48 the same. If the selected loop is a virtual loop 48, the gateway 36 will translate the ISDN concepts for processing in the IP domain, and vice versa.

Figure 4:
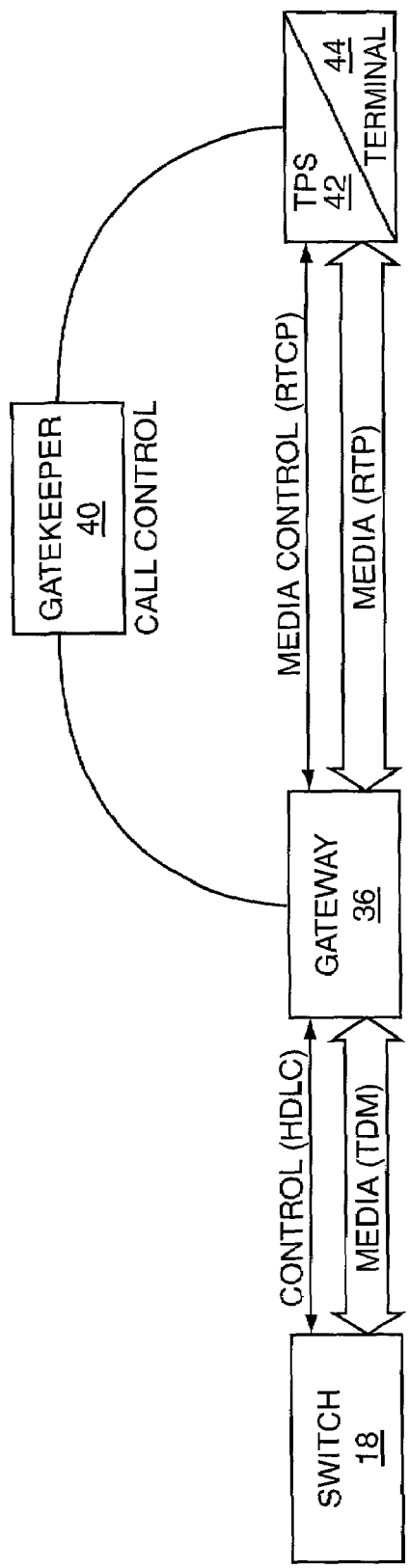
FIG. 4 is a block representation of the primary elements facilitating call control and media flow according to a preferred embodiment of the present invention.

With reference to FIG. 4, the roles and responsibilities of the primary components with respect to the present invention are described. Preferably, through the LTCIs 28, the switch 18 will support the various services associated with the PSTN 12. Prior to effecting telephony communications, the switch 18 will typically provision directory numbers for the IP terminals 44, which are associated with virtual loops 48 identified by loop TIDs. Multiple IP terminals 44, in addition to PSTN terminals 20, may have a common directory number in a MADN group 16.

The switch 18 will preferably provide a static data download of the provisioning information by transferring the provisioning information to the gateway 36, which in turn will transfer the data to the gatekeeper 40. As will be described in further detail below, the gatekeeper 40 uses the provisioning information to assist call signaling and services for the IP terminals 44 or TPS 42. Once provisioned, the switch 18 will provide the basic call and supplementary services for associated elements in the PSTN network 12 and the IP network 14 as well as provide billing and OA&M associated with the connection of two or more parties for a call.

The gateway 36 assumes numerous roles and responsibilities. The gateway 36 will provide protocol conversion for media and call control between the PSTN 12 and the IP network 14. For the preferred embodiment, the protocol conversion is between concepts embodied in Q.931 or HDLC and a modified version of H.323 for call signaling. Conversion for the actual media is preferably between TDM voice or media signals in the PSTN 12 and packetized voice in the IP network 14. The packetized voice preferably uses RTP for media transfer and the real time control protocol (RTCP) for control of the media transfer. The gateway 36 will also support CODEC (coding/decoding) negotiation with other entities in the IP network 14 to ensure that communications between the two devices in the IP network 14 are using identical coding and decoding.

In essence, the gateway 36 presents the IP terminals 44 to the switch 18 as if they were ISDN basic rate interface terminals connected to a dedicated loop 32 on a line card 30. For the converse, the gateway 36 presents the switch 18 to the gatekeeper 40 as an H.323 endpoint, such as another terminal 44. Importantly, the gateway 36 is configured to pass the loop TID information through from the switch 18 to the gateway 36 to distinguish IP terminals 44 having a common directory number. The gateway 36 also supports the static data download of the provisioning information from the switch 18 to the gatekeeper 40 to communicate valid directory numbers and their associated loop TIDs.

Typically, the gatekeeper 40 is responsible for zone management, admissions control, bandwidth management, and authentication of the IP terminals 44. The gatekeeper 40 handles registration of the IP terminals 44 in a manner providing an association between a logical identifier, such as the directory number or other alias, and the physical location of the IP terminal 44. The physical location is typically an IP address and port of an IP terminal 44 to handle incoming call signaling. Preferably, the gatekeeper 40 will authenticate IP terminals 44 based on an assigned authentication token, which is typically included in the H.323 messages between the IP terminals 44 and the gatekeeper 40.

The gatekeeper 40 will preferably insert the loop TID information into the messages originating from the IP terminals 44 before forwarding the messages to the gateway 36. Again, the loop TID information is provided by the gatekeeper 40 to allow the gateway 36 to identify which virtual loop 48, and thus which IP terminal 44, is requesting a call. Thus, the gatekeeper 40 manages the mapping of directory numbers to IP addresses for the IP terminals 44. Further, these IP terminals 44 are associated with the corresponding loop TIDs, which is particularly beneficial when multiple IP terminals 44 have a common directory number.

As noted above, a mapping between the PSTN and IP network concepts is necessary to support a full set of residential and business services from the PSTN 12 in the IP network 14. The High-level Data Link Control (HDLC) protocol may be used as a transport protocol to carry an internal protocol which facilitates Q.931 concepts in the PSTN 12, wherein H.323 is the foundation for call signaling in the IP network 14. Further information on HDLC is provided in the International Standards Organization (ISO) Reference 3309, which is incorporated herein by reference in its entirety. Thus, a mapping of basic concepts is required between Q.931 and H.323. In essence, the standard H.323 provides a limited set of call signaling concepts. In contrast, the ISDN basic rate interface supported by the PSTN 12 will expect a full complement of the Q.931 concepts. Preferably, a Q.931 directory number will map to an H.323 alias, which may include an email address, name, directory number, or any suitable logical identifier. The loop TID in Q.931 will preferably map to an H.323 EID. The Q.931 call reference will map to the H.323 call reference value.

Notably, H.323 provides a user-to-user information element (UUIE). For the present invention, the UUIE is used to carry information that is not in the PSTN's Q.931 protocol. The gatekeeper 40 and gateway 36 are adapted to unpack and recognize the content of the UUIE in H.323 messages. Preferably, the UUIE will be used to transport the loop TID between the gatekeeper 40 and the gateway 36. Q.931 feature activators or indicators are used between the gateway 36 and the various IP terminals 44 to communicate the feature activation request and feature activiation indicators. Depending on the configuration, the IP terminals 44, TPS 42, gatekeeper 40, and gateway 36 may all use the UUIE in various capacities to transfer information relating to concepts not supported by H.323, but that are supported by ISDN or the PSTN 12.

To support additional services at the various IP terminals 44, feature activators and feature indicators must be effectively communicated between the PSTN 12 and the IP terminals 44 or a supporting TPS 42. In general, a feature activator represents a request for a specified feature to be sent from one entity to another for fulfillment. A feature indicator is usually the response to the feature activator request. For example, a feature activator may be associated with a hold or forwarding function, and the feature indicator may correspond to instructions to light an LED associated with a hold or forward button on the IP terminal 44. The feature activators may be associated with a variety of services, and the feature indicators may be associated with any number of commands or actions.

As noted, the UUIE in H.323 messages is used to effect call control, including media negotiation. Call control messages supported between IP components, such as the gateway 36, gatekeeper 40, TPS 42, and IP terminals 44, are based upon the ITU specification H.225 plus supported ISDN basic rate interface Q.931 and Q.932 extensions. An example UUIE format follows, wherein each row represents one byte.

---

Subtype field ID
Media type
Operation type
Media transport
Number of CODECs
IP address 1
IP address 2
IP address 3
IP address 4
Port 1
Port 2
CODEC identifier
Sample size
Samples per packet

---

The subtype field ID will typically identify the type of field, such as a media control field. The media type is typically audio or video. The operation type will correlate to the type of operation required, such as open, close, redirect, or modify. The media transport field will typically include options for inactive, send only, receive only, or send and receive. The number of CODECs field identifies the number of CODECs included in the UUIE. Preferably, multiple CODECs are provided to ensure that the communicating entities have access to at least one common CODEC. The IP address and port fields identify an IP address and port for the originating device. The CODEC identifier field identifies an acceptable CODEC. Sample size typically identifies a period between samples, and the samples per packet field identifies the number of samples included in a particular media packet. If multiple CODECs are provided, the UUIE will identify all the available CODECs and their respective IP address and port numbers.

Preferably, media information can be attached to any UUIE. For the present invention, it is preferably attached to UUIEs in setup, call proceeding, connect, progress, alert, facility, and connect acknowledgement messages. Further, an offset is preferably provided for each UUIE type, so that when a UUIE is parsed, the parsing device knows where the media information starts. To avoid the complication and overhead associated with an Abstract Syntax Notation (ASN) compiler, the UUIE types and their headers may be predefined or hard-coded.

Preferably, the messages supported above and beyond standard H.323 include:

MADN messages, including key hold, key setup, key setup acknowledge, and key release;

Hold and retrieve messages, including hold, hold acknowledge, hold reject, retrieve, retrieve acknowledge, and retrieve reject;

Feature messages, including information and notify, particularly those including feature activator and indicator elements;

National specific (code set 5) display text information elements; and

Network specific (code set 6) call appearance information element.

Readers are referred to the Bellcore documentation for additional details of the format and content of these messages. Particular reference is made to TR-268, SR-3888, TW-205-ISDN EKTS generic requirements in the Bellcore specifications, which are incorporated herein by reference in their entirety. For the present invention, the MADN messages, including key hold, key setup, key setup acknowledge, and key release are of particular interest. When a terminal in a given MADN group 16 originates a call using the common directory number, a key setup message is sent to other members of the MADN group 16 to alert the other members of the MADN group 16 of the call and provide sufficient information for them to join the call, if desired. Preferably, a UUIE is added to the Q.931 key setup message to communicate media path information. An exemplary key setup message appears below.

---

Message Type IE
    Type: Key Setup
Call Reference IE
    Flag: Sender   Value: 3
Bearer Capability
    Info Transfer Capability: Speech
    User Information Layer 1 Protocol: Recommendation G.711 U-law
    Coding Standard: ITU_T
    Transfer Mode: Circuit Mode
    Transfer Rate: 64 Kbps
Notification Indicator IE
    Indicator: Privacy disabled
Endpoint Identifier IE
    User Service ID: 112
    Interpreter Bit: 0

-continued

```
Endpoint ID-Terminal ID: 0
Called Party Number IE
    Network Type: Local/Subscriber number
    Numbering Plan: ISDN or Telephony numbering plan
    Digits: 6137234568
User-to-User IE
    IP Addr: 47.1.2.3    Port: 2326      TID: [NN: 1 TN: −1]
    OpType: 0 (open)    trans: 3 (rxtx)   insw: 0     Codecs: 5
    #0   type:5-G729        fs:10   fpp:2    47.1.2.3:2326
    #1   type:2-G711U64K    fs:1    fpp:20   47.1.2.3:2326
    #2   type:2-G711U64K    fs:1    fpp:30   47.1.2.3:2326
    #3   type:0-G711A64K    fs:1    fpp:20   47.1.2.3:2326
    #4   type:0-G711A64K    fs:1    fpp:30   47.1.2.3:2326
```

The call reference information element associates the message with a particular call in progress. The endpoint identifier information element identifies the terminal to which the message is directed. The called party number information element identifies the terminating party's number, network type, and numbering plan. The UUIE preferably includes an IP address and port for the remote party, a loop TID if necessary, and a list of CODECs the remote party can support. With the present invention, the remote party for an IP terminal 44 is the gateway 36. As shown, the CODEC list provides for the CODEC type, frame size, frames per packet, and RTP address and port. Since the call is directed to a specific terminal, a loop TID is not necessary in the illustrated message. The loop TID is preferably defined with two integers, following the NN: and TN: fields, respectively. A −1 indicates that a loop TID is not present in the UUIE.

The key setup acknowledgement messages is sent from the MADN terminal 44 in response to a key setup message. Again, the UUIE component, as described above, is added to the Q.931 key setup acknowledgement message. An exemplary key setup acknowledgement message follows.

```
Message Type IE
    Type: Key Setup Ack
Call Reference IE
    Flag: Receiver   Value: 3
User-to-User IE
    IP Addr: 3.133.0.126   Port: 7184       TID: [NN: 95 TN: 1]
    OpType: 0 (open)      trans: 0 (inact)   insw: 0     Codecs: 4
    #0   type:5-G729        fs:10   fpp:2    47.174.64.212:6006
    #1   type:2-G711U64K    fs:1    fpp:20   47.174.64.212:6006
    #2   type:2-G711U64K    fs:1    fpp:30   47.174.64.212:6006
    #3   type:0-G711A64K    fs:1    fpp:20   47.174.64.212:6006
```

The exemplary key setup acknowledgement message includes a loop TID for the responding terminal to identify the responding terminal to the gatekeeper 40, and ultimately the switch 18.

After an incoming call is answered at a terminal in a MADN group 16, a key hold message is sent to all other users in the MADN group 16 to inform them that the call has been answered. The key hold message informs the other terminals that signaling for alerting the terminals of the incoming call may be discontinued, the call is in progress, and the call reference should be retained. Again, a UUIE component is added to the Q.931 key hold message. An exemplary message type appears below.

```
Message Type IE
    Type: Key Hold
Call Reference IE
    Flag: Sender   Value: 4
Notification Indicator IE
    Indicator: Privacy disabled
Signal IE
    Value: Altering OFF
User-to-User IE
    IP Addr: 3.21.0.126   Port: 2320
```

When multiple terminal in a MADN group 16 are participating in a call and one of the terminals sends a disconnect or release message to end participation in the call, a key release message is sent to the disconnecting terminal to indicate that the call remains in progress. As such, the disconnecting terminal is expected to stop sending and receiving media, but maintain the call reference so that future bridging by the disconnecting terminal is possible. A Q.931 key release message appears below.

```
Message Type IE
    Type: Key Release
Call Reference IE
    Flag: Sender   Value: 4
User-to-User IE
    IP Addr: 3.21.0.126   Port: 2320
```

Figure 5:
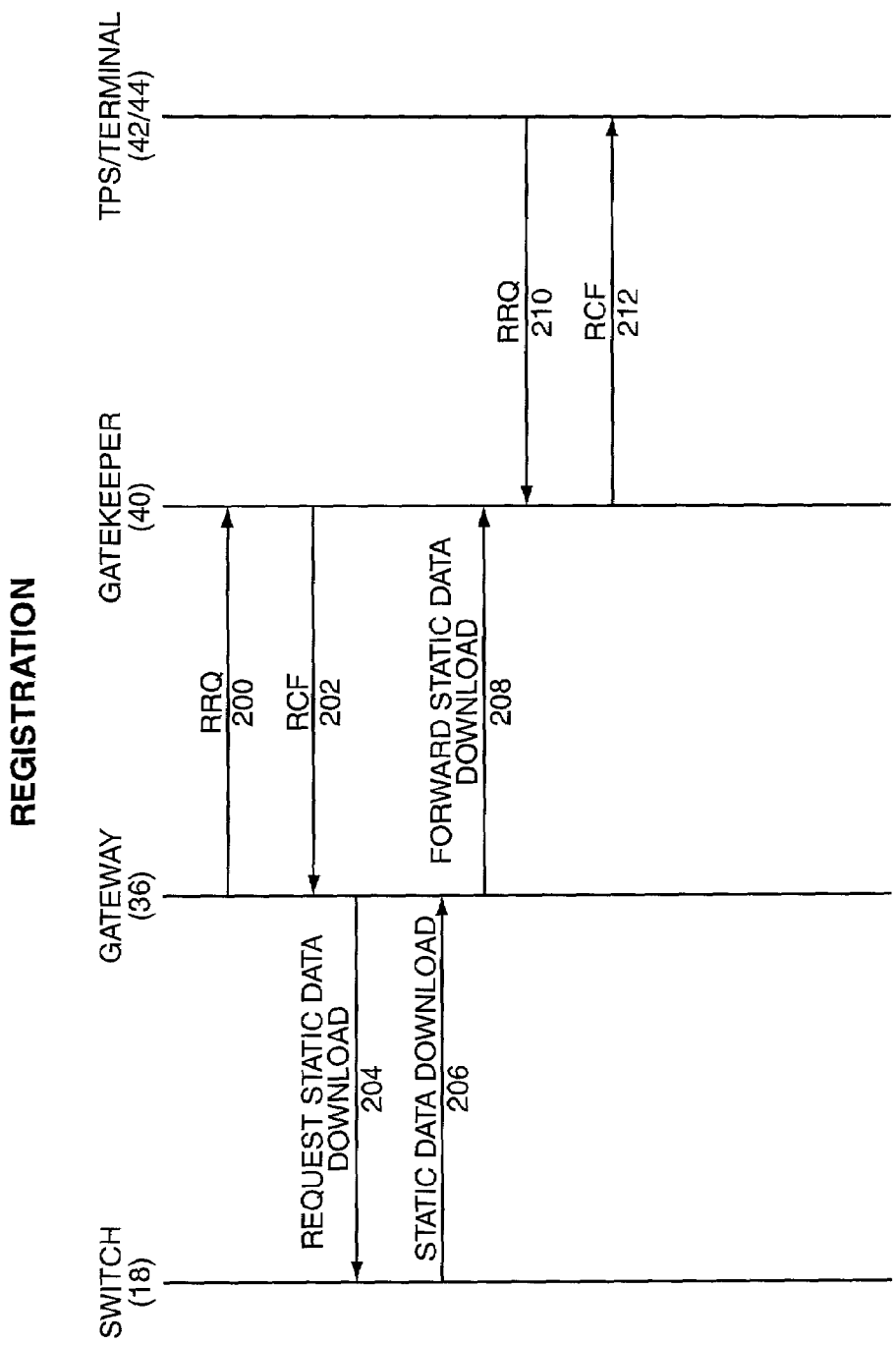
FIG. 5 is a call flow diagram of a preferred registration process according to the present invention.
Figure 6:
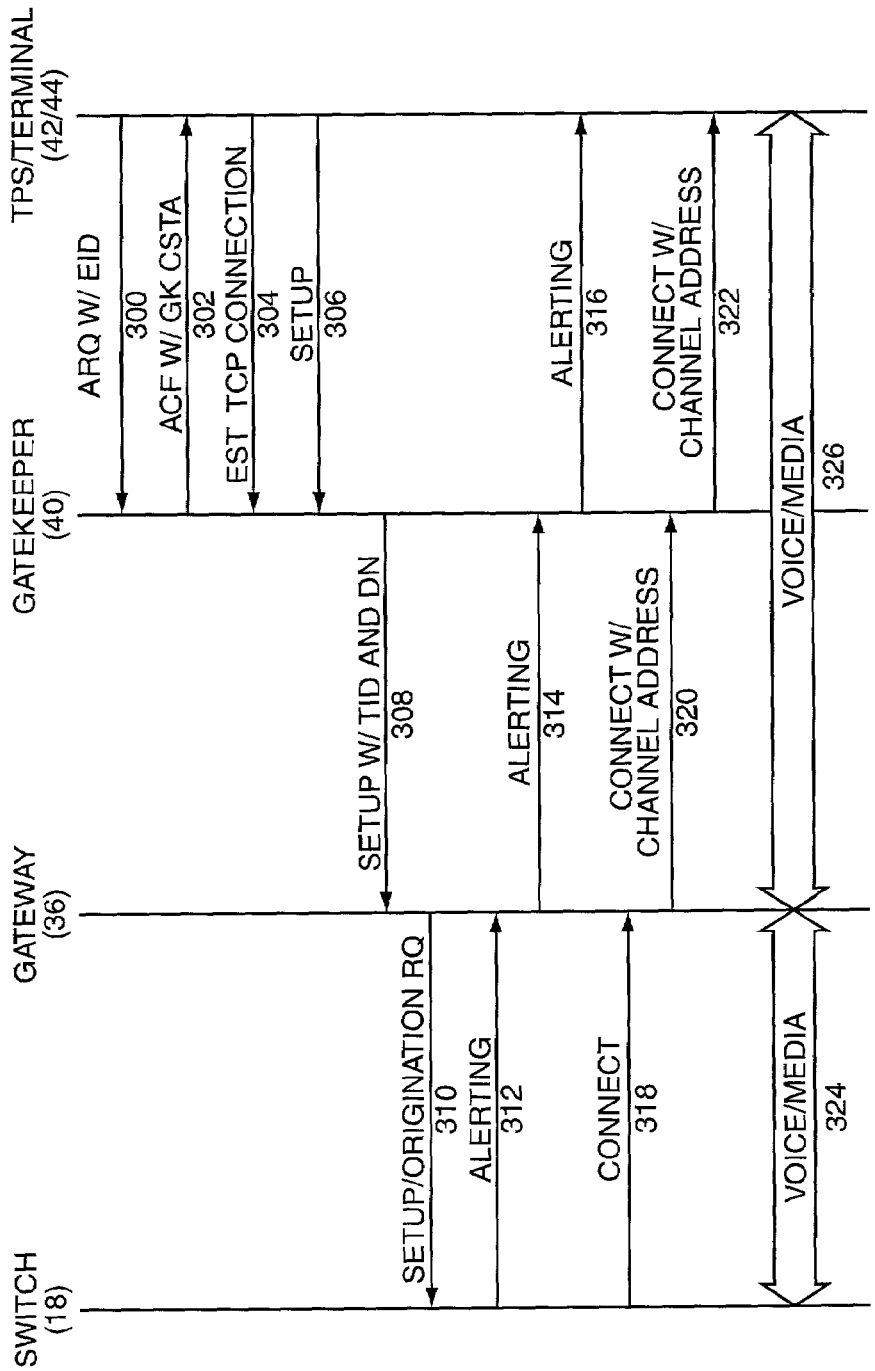
FIG. 6 is a call flow diagram outlining a preferred call flow for establishing a call to the PSTN from an IP terminal.
Figure 7:
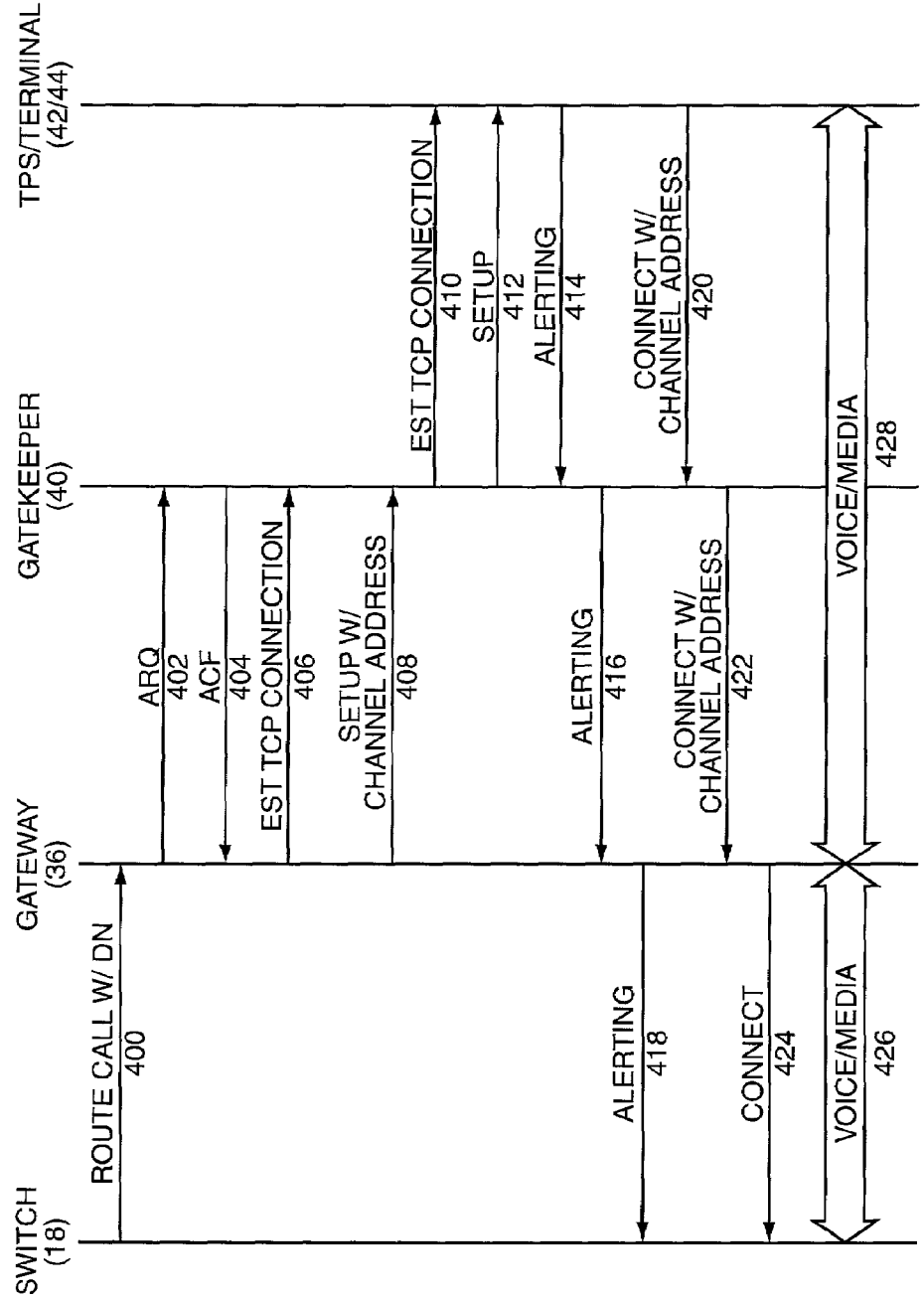
FIG. 7 is a call flow diagram outlining a preferred call flow for establishing a call to an IP terminal from the PSTN.

Prior to providing exemplary call flow diagrams for MADN operation, selected call flows outlining terminal registration and establishing calls between the PSTN 12 and IP terminals 44 are described in reference to FIGS. 5, 6, and 7.

Turning now to FIG. 5, a call flow diagram is provided outlining the provisioning and registration process of a preferred embodiment of the present invention. Notably, the call flow relates to provisioning for an IP terminal 44 using a TPS 42, or for a sophisticated terminal 44 capable of communicating with the gateway 36 and gatekeeper 40 without requiring a TPS 42.

Initially, the switch 18 provides a list of directory numbers available for assignment to IP terminals 44. For example, assume directory number 613-723-2360 is assigned to an IP terminal A, and directory number 613-723-8567 is assigned to an IP terminal B. The switch 18 will map these directory numbers to virtual IP loops 48 corresponding to loop TIDs 35, 112 and 35, 114, respectively. At this point, the gateway 36 is brought into service to interact with the elements of LAN 38.

Assuming the gatekeeper 40 is operational, the gateway 36 will send a registration request (RRQ) to the gatekeeper 40 in order to register itself, as an H.323 terminal, with the gatekeeper 40 (step 200). The registration request will preferably include the gateway's type (such as a DMS Centrex IP gateway), a call signaling transport address (CSTA), and any aliases for the gateway 36. The gatekeeper 40 will process the registration request and return a registration confirmation (RCF) to the gateway 36 (step 202).

At this point, the gateway 36 is registered with the gatekeeper 40 and is ready to begin a static data download of provisioning information from the switch 18. As such, the gateway 36 will request a static data download from the switch 18 (step 204). In response, the switch 18 will send the static data to the gateway 36 (step 206), which forwards the information to the gatekeeper 40 (step 208). Preferably, the static data informs the gatekeeper 40 that loop TID 35, 112 is associated with directory number 613-723-2360 and loop TID 35, 114 is associated with directory number 613-723-8567, and that these are valid directory numbers. The gatekeeper 40 will process the static data and store the information in an accessible database. At this point, the gateway 36 is registered with the gatekeeper 40, and the gatekeeper 40 has the basic provisioning data for at least two IP terminals A and B.

Next, the IP terminals A and B (or TPS 42 supporting these terminals) need to register with the gatekeeper 40, as H.323 terminals. For example, IP terminal A will send a registration request to the gatekeeper 40 to initiate registration (step 210). Preferably, the registration request will specify that IP terminal A uses an alias of 613-723-2360, which should correspond to the directory number provisioned by the switch 18. The registration request will also include a CSTA, which identifies an IP address and port number to which to send call signaling when someone is calling the directory number for terminal A (613-723-2360). The gatekeeper 40 will respond with a registration confirmation (step 212). Preferably, the registration confirmation will include an endpoint ID for the terminal, which the terminal should store. At this point, the gatekeeper 40 associates IP terminal A's logical ID, which is the directory number 613-723-2360, and its physical address, which is the CSTA 47.192.74.60 6400.

The call diagram of FIG. 6 outlines an exemplary call flow for establishing a call to a PSTN device from an IP terminal 44. Preferably, the IP terminal 44 (or TPS 42) will send an admission request (ARQ), including the terminal's EID and specifying the directory number to call, to the gatekeeper 40 (step 300). Assume that the directory number for the device being called in the PSTN is 723-8888. The gatekeeper 40 will recognize the IP terminal 44 initiating the call based on the EID supplied in the admission request. The gatekeeper 40 will then return an admission confirmation (ACF) including the gatekeeper's own CSTA (step 302). The admission confirmation is received by the IP terminal 44 as instructions to initiate a setup message to the supplied CSTA of the gatekeeper 40.

The IP terminal 44 will then establish a TCP connection to the gatekeeper 40 using the CSTA (step 304). The IP terminal 44 will then send a setup message for originating the call to the gatekeeper 40 via the gatekeeper's CSTA (step 306). Preferably, the setup message provided by the IP terminal 44 (or TPS 42) will include a UUIE that specifies an RTP/RTCP channel (and port, if necessary) on which the IP terminal 44 will be listening for voice or media packets, as well as the endpoint ID (EID) indicating which terminal sent the message. The EID is important since the TPS 42 will represent multiple terminals and use the same IP address and port to talk to the gatekeeper 40, hence the gatekeeper 40 cannot distinguish which terminal sent the message purely based on the sender's IP address and port. The gatekeeper 40 will receive the setup message from the terminal 44 and recognize which terminal sent the message based on the source IP address in the setup message and the EID.

The gatekeeper 40 will recognize that the IP terminal 44 is served by the gateway 36 and insert the loop TID associated with the IP terminal 44, along with the directory number being called, into the UUIE of the setup message and forward the setup message to the gateway 36 (step 308). The loop TID is inserted to enable the gateway 36 to recognize the particular IP terminal 44 initiating the setup message. The gateway 36 will receive the setup message, parse out the information in the UUIE, and send a setup or appropriate origination request to the switch 18 (step 310). The setup origination request will include the directory number to call, and the switch 18, alone or in combination with other PSTN elements, will process the origination request and alert the appropriate PSTN user associated with directory number 723-8888 of the call. During this time, the switch 18 will send an ISDN alerting message back to the gateway 36 (step 312), which will send an H.323 alerting message to the gatekeeper 40 (step 314). The gatekeeper 40 will forward the alerting message on to the IP terminal 44 (step 316).

When the called party associated with directory number 723-8888 answers the call, the switch 18 will forward an ISDN connect message to the gateway 36 in conventional fashion (step 318). At this point, the gateway 36 will allocate an RTP/RTCP channel and package the corresponding channel address or addresses and the UUIE of an H.323 connect message to send to the gatekeeper 40. As such, the connect message with the channel address for voice or media communications is sent to the gatekeeper 40 (step 320). The gatekeeper 40 will forward the connect message with the channel address on to the terminal 44 (step 322).

During this time, the gateway 36 will listen for voice or media on the RTP channel corresponding to the channel address sent in the UUIE of the connect message from the IP terminal 44. The gateway 36 will also start to send voice or media packets received from the switch 18 (from the caller at directory number 723-8888) to the IP terminal's RTP channel. As noted, the IP terminal's RTP channel was sent in the UUIE of the setup message. At this point, both users may transfer voice or media to one another, wherein communications between the switch 18 and gateway 36 are transmitted using pulse code modulated data in a time division multiplexed format (step 324), and communications between the gateway 36 and the IP terminal 44 (or TPS 42) are preferably RTP packets (step 326). When either user releases the call, the RTP channels are closed, and the TCP connection is taken down. Preferably, the IP terminal 44 will send a disconnect request to the gatekeeper 40 indicating that the bandwidth can be freed, wherein the gatekeeper 40 will confirm the release or disconnect request.

With reference to FIG. 7, a call flow diagram is provided representing the primary steps for effecting a call to an IP terminal 44 from the PSTN 12. Assume that a PSTN terminal 20 is originating a call to IP terminal A, which is associated with directory number 613-723-2360. Once the origination request is received by the switch 18, the switch 18 will route the call to the loop associated with directory number 613-723-2360. In this example, the selected directory number is associated with a virtual loop 48, having a loop TID, supported by a gateway 36. Thus, the switch 18 routes the call with the directory number to gateway 36 (step 400). The gateway 36 will ask the gatekeeper 40 for permission to establish the call via an admission request (step 402), which is confirmed by the gatekeeper 40 with an admission confirmation (step 404). In response, the gateway 36 will establish a TCP connection with the gatekeeper 40 (step 406) and send a setup message with the RTP channel address, in which the terminal should send voice or media packets (step 408).

In response, the gatekeeper 40 will process the directory number (613-723-2360) of the IP terminal 44 being called, and will select a CSTA associated with that directory number (CSTA=47.192.74.60 6400).

The gatekeeper 40 will then establish a TCP connection to address 47.192.74.60 6400, which corresponds to IP terminal A or the TPS 42 for IP terminal A (step 410). The gatekeeper 40 then sends the setup message to the specified IP terminal 44 (step 412). In response, the IP terminal 44 will send an alerting message to the gatekeeper (step 414), which forwards the alerting message to the gateway 36 (step 416), which further forwards an ISDN alerting message to the switch 18 (step 418).

Similarly, the IP terminal 44 will send a connect message including the RTP channel address (step 420). The RTP channel address is included to identify an address of the IP terminal 44 to which the gateway 36 should send the voice or media packets. The gatekeeper 40 will forward the connect message containing the RTP channel address to the gateway 36 (step 422). The gateway 36 will unpack the UUIE of the connect message to identify the RTP channel of the IP terminal 44 to which to send the voice or media packets, and forward an ISDN connect message to the switch 18 (step 424). At this point, the switch 18 and gateway 36 are configured to communicate (step 426), and the gateway 36 and the terminal 44 have established the RTP addresses between which voice and media communications will take place (step 428). As noted above, the gateway 36 will translate the voice and media packets to TDM data for transport in the PSTN 12, and vice versa.

Once a call is established, traditional residential and business services of the PSTN 12 are made available to the various IP terminals 44 by embedding the necessary control signals and affiliated data within H.323 messages sent between the gateway 36, gatekeeper 40, and IP terminal 44 or TPS 42. As noted, the control information or data is preferably embedded in the Q.931 FA/FI or UUIE of the H.323 message for transport between the IP terminal 44 or TPS 42 and the gateway 36. For example, if the hold key is depressed on the IP terminal 44, the corresponding H.323 message is sent from the IP terminal 44 to the gateway 36 via the gatekeeper 40, and, if necessary, the TPS 42. Depending on whether the actual H.323 message is initiated by the IP terminal 44 or by the TPS 42, a feature activator is embedded in the Q.931 messages and sent to the gateway 36 via the gatekeeper 40.

In response, the gateway 36 will forward the feature activator to the switch 18 of the PSTN 12 as if the feature activator was sent from a regular PSTN terminal 20. The switch 18 will respond with a feature indicator corresponding to the feature activator by sending the feature indicator in a control message to the gateway 36. The gateway 36 will embed the feature indicator in a Q.931 message, and send the message to the gatekeeper 40 for forwarding to the IP terminal 44 or TPS 42.

If the TPS 42 is used, the TPS 42 will unpack the information from the UUIE and send a corresponding control signal to the IP terminal 44 using an appropriate protocol, such as the aforementioned UNISTEM protocol. As such, the present invention provides an efficient way for emulating traditional PSTN terminals 20 in an IP network environment 14. Further, the IP terminals 44 are controlled by entities in the PSTN 12, and can access all of the services normally available only to traditional PSTN terminals 20.

FIGS. 8A, 8B, 9A, 9B, and 10 outline basic call flows in a MADN environment according to the present invention. The scenarios for each of the three call flows assume a MADN group 16 with at least one PSTN terminal A1 and at least one IP terminal A2. Notably, the IP terminal A2 may be a terminal supported by a TPS 42 or may be a self-sufficient terminal 44. In the former case, the TPS 42 will interpret the described call signaling as necessary to interact with and control the supported IP terminal 44. Further, the switch 18 and gateway 36 are shown as integrated to simplify the call flow diagrams and to better illustrate the inventive concepts of the present invention. As such, call signaling between these entities are not illustrated.

Figure 8A:
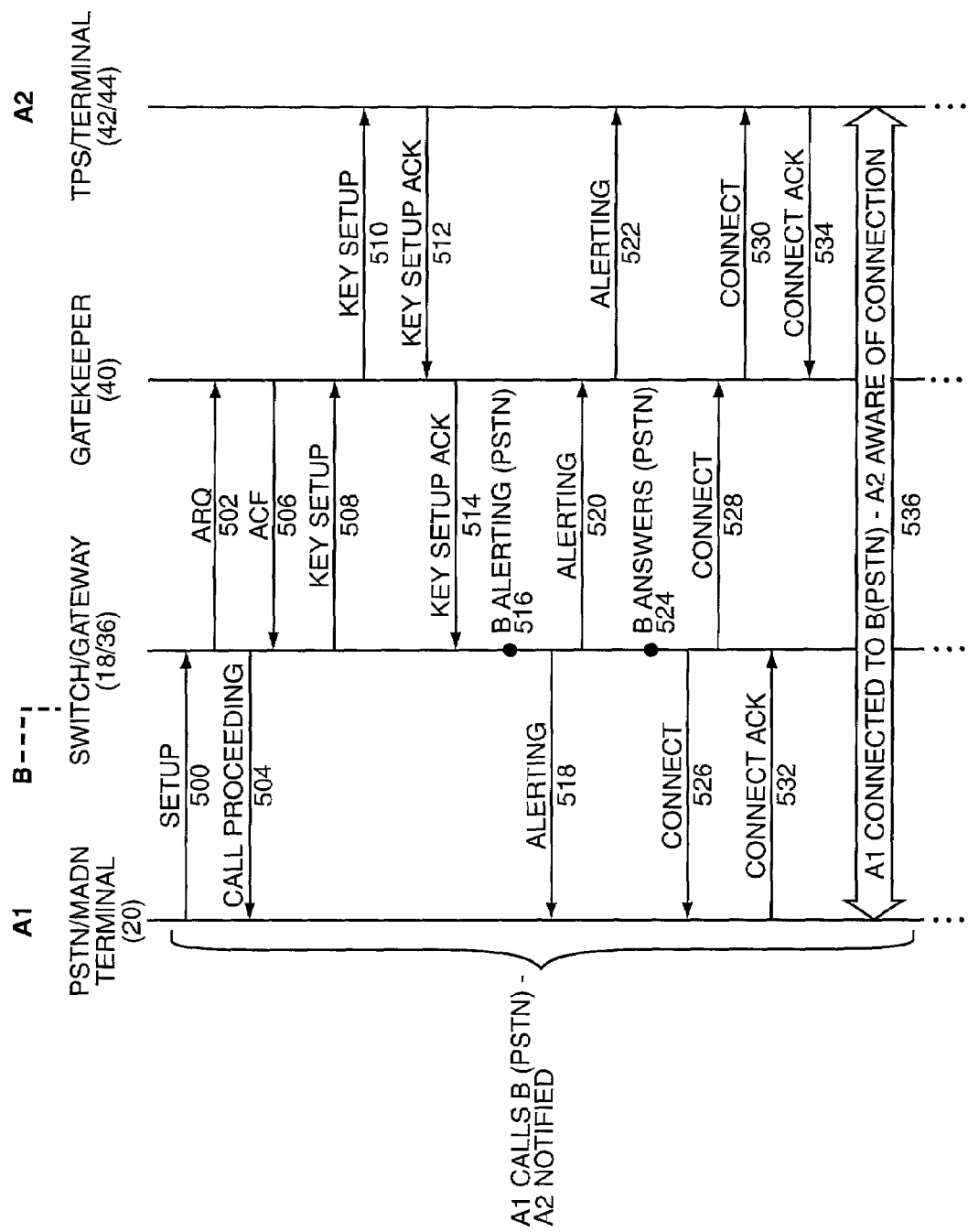
FIGS. 8A and 8B are a call flow diagram outlining an exemplary call flow in a first MADN call scenario.
Figure 8B:
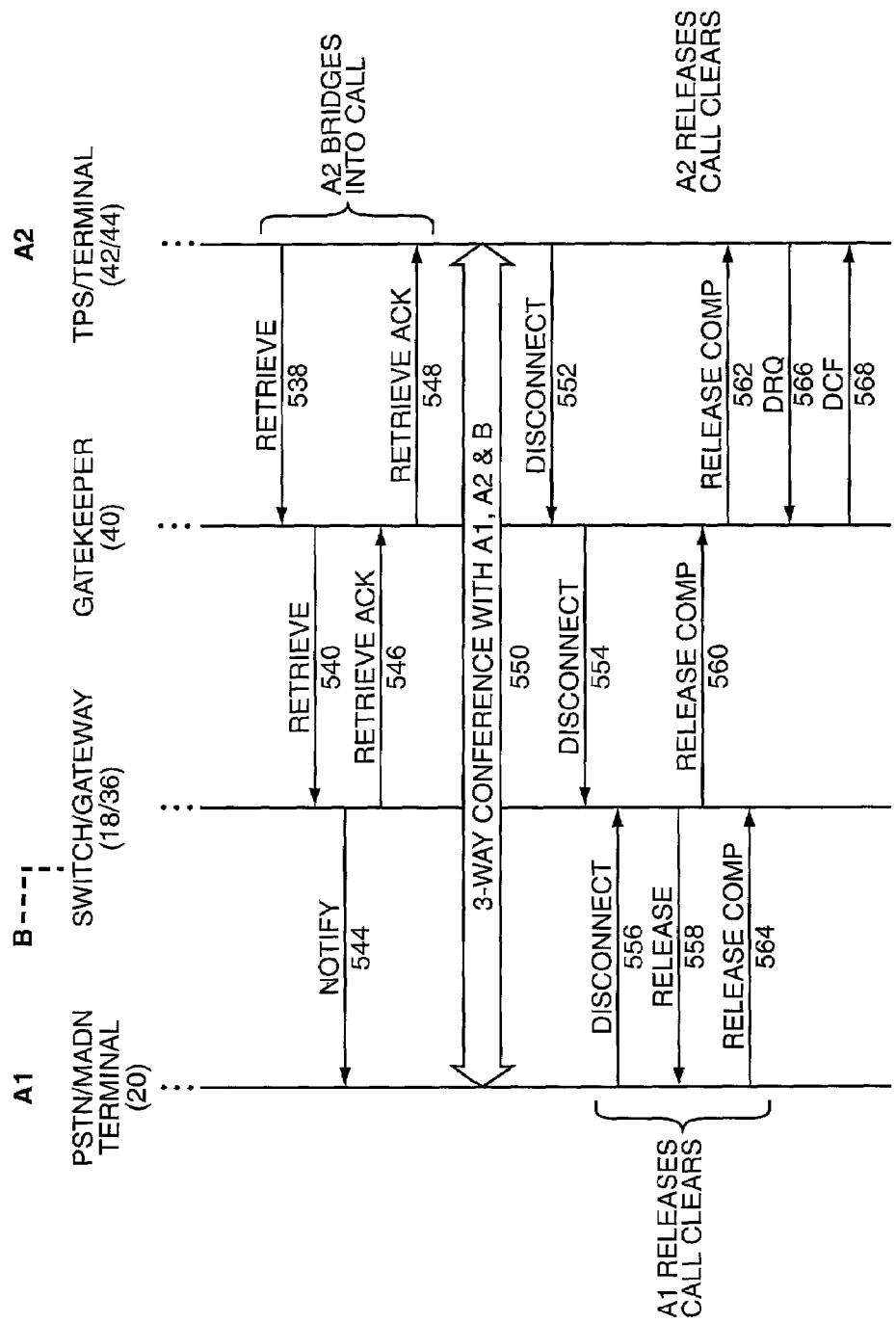

The call flow diagram of FIGS. 8A and 8B outlines a scenario wherein the PSTN terminal A1 of the MADN group 16 originates a call to terminal B, which is outside of the MADN group 16. Following an answer by terminal B, the IP terminal A2 of the MADN group 16 bridges in and then subsequently releases the call. The call flow for this scenario follows.

Terminal A1 will initiate a setup message to the switch 18 (step 500). In response, the gateway 36 will then initiate an admission request (ARQ) (step 502) to the gatekeeper 40. In the meantime, the switch 18 will respond to the PSTN terminal A1 with a call proceeding message (step 504). The gatekeeper 40 will respond to the admission request message with an admission confirmation message (step 506). In response, the gateway 36 will send a key setup message to the gatekeeper 40 (step 508), which will forward the key setup message to the IP terminal A2 (step 510). In response to the key setup message, the IP terminal A2 will send a key setup acknowledgement message to the gatekeeper 40 (step 512), which will forward the key setup acknowledgement message to the gateway 36 (step 514).

At this point, the switch 18 will alert the non-MADN group terminal B (step 516) and send an alerting message to the PSTN terminal A1 (step 518). An alerting message is also sent by the gateway 36 to the gatekeeper 40 (step 520), which forwards the alerting message to the IP terminal A2 (step 522). At this point, PSTN terminal A1 has originated a call to terminal B. Terminal B is ringing and terminal A1's MADN group associate, terminal A2, is aware of the origination of the call.

Assuming that terminal B answers the call from terminal A1 (step 524), the switch 18 will send a connect message to terminal A1 (step 526) and to IP terminal A2 via the gateway 36 and gatekeeper 40 (steps 528 and 530). The PSTN terminal A1 will respond to the switch 18 with a connect acknowledgement message (step 532), and the IP terminal A2 will respond to the gatekeeper 40 with a connect acknowledgement message (step 534). At this point, PSTN terminal A1 is connected to the non-MADN terminal B, and IP terminal A2 is aware of the connection (step 536).

Assume at this point that IP terminal A2 is directed to bridge into the call between PSTN terminal A1 and terminal B. IP terminal A2 will initiate a retrieve message, which is sent to the gatekeeper 40 (step 538) and forwarded by the gatekeeper 40 to the gateway 36 (step 540). In response the switch 18 will send a notify message to the PSTN terminal A1 (step 544). Further, the gateway 36 will respond to the retrieve message with a retrieve acknowledgement message to the gatekeeper 40 (step 546), which forwards the message to IP terminal A2 (step 548). At this point, IP terminal A2 has joined the call between PSTN terminal A1 and terminal B to form a three-way conference call (step 550).

Assume at this point that terminal A2 is directed to release itself from the conference call. The standard Q.931 specification requires a three-stage release when there are resources, such as the bearer channel, involved in the call, to make sure that the resources are de-allocated. H.323 specifies a single-stage release, since the release complete message is generally guaranteed to be delivered via the transport control protocol (TCP). For the present invention, these standards are modified to provide a two-stage release. The release is preferably TCP-based to ensure reliable transport, but requires a release complete message to carry feature information necessary to support MADN features to the disconnecting terminal. Thus, in response to a disconnect, the PSTN 12 will respond with a release complete message. The terminal initiating the release will preferably send a release or disconnect message, giving the switch a chance to reply with a release complete message that can carry feature indication information such as lamp status changes.

As such, the IP terminal A2 will send a disconnect message to the gatekeeper 40 (step 552), which will forward the message to the gateway 36 (step 554). Further assuming that the PSTN terminal A1 also intends to release the call, PSTN terminal A1 will also send a disconnect message to the switch 18 (step 556). The switch 18 will respond to the PSTN terminal A1 with a release message (step 558). The gateway 36 will send a release complete message to the gatekeeper 40 (step 560), which will forward the release complete message to the IP terminal A2 (step 562). PSTN terminal A1 will send a release complete message to the switch 18 in response to the release message (step 564). Concurrently, the IP terminal A2 will send a disconnect request message to the gatekeeper 40 (step 566), which will respond with a disconnect confirmation message (step 568). At this point, the PSTN terminal A1 and IP terminal A2 of the MADN group 16 are cleared from the call.

Figure 9A:
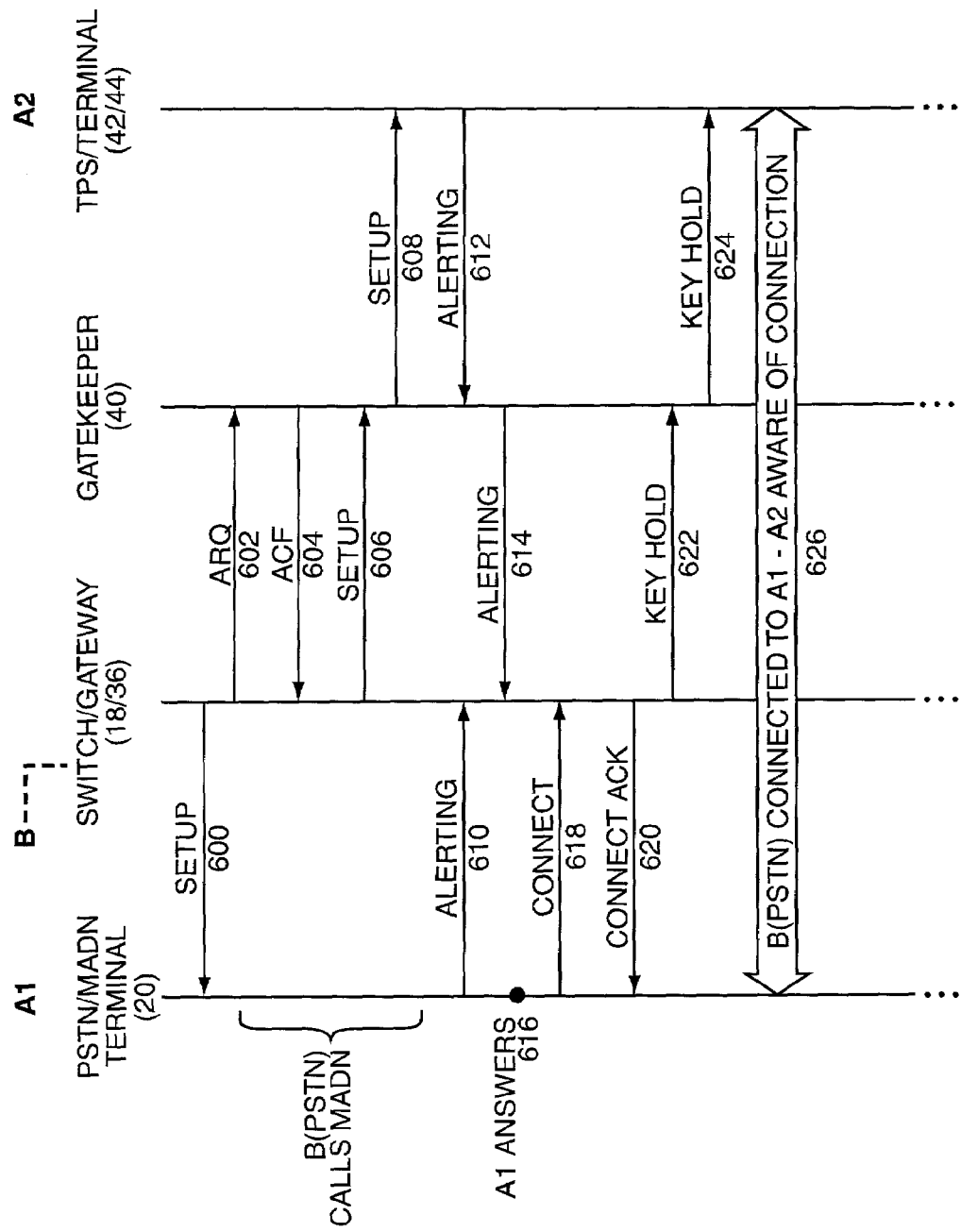
FIGS. 9A and 9B are a call flow diagram outlining an exemplary call flow in a second MADN call scenario.
Figure 9B:
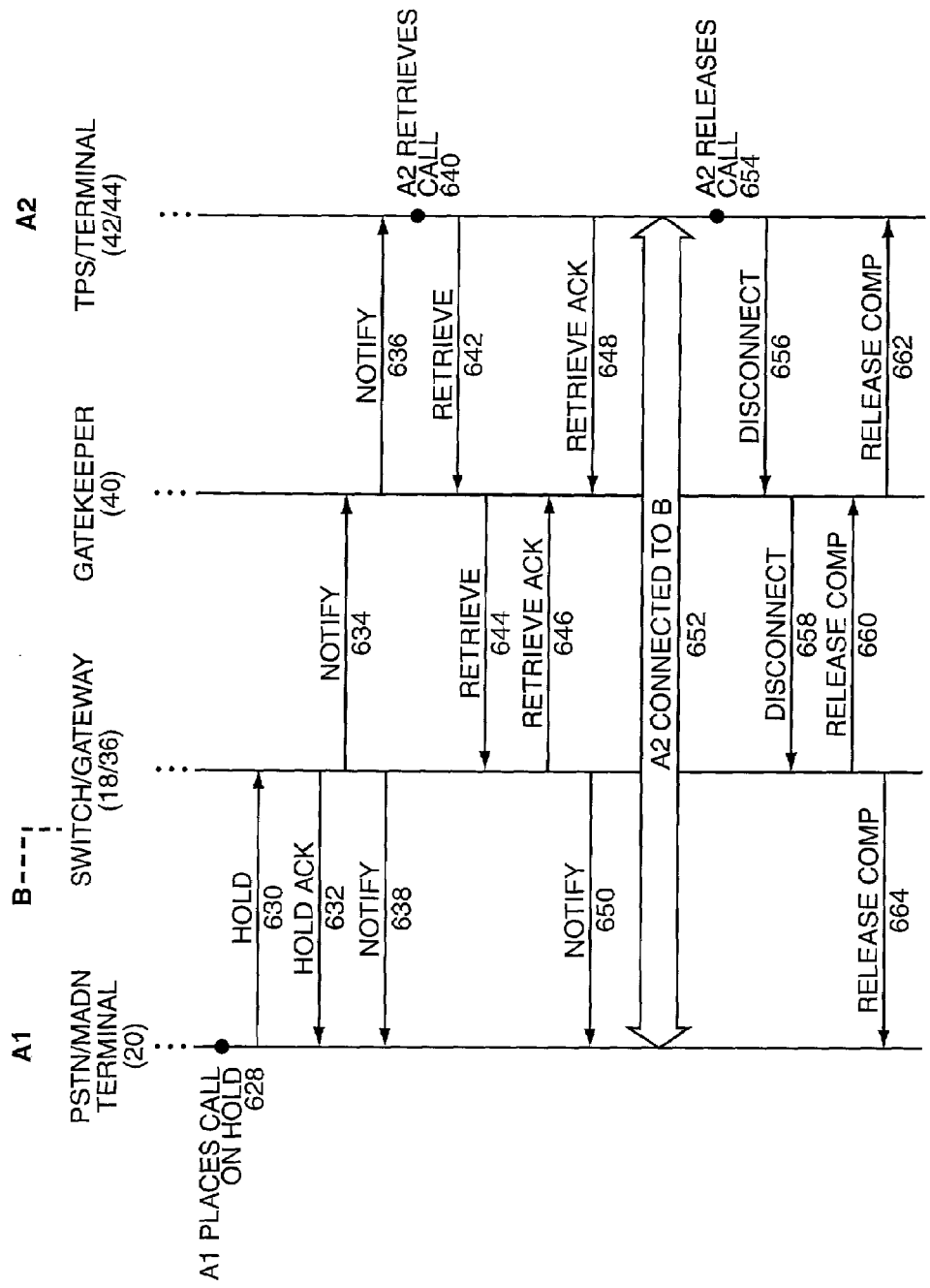

Turning now to FIGS. 9A and 9B, a call flow for a second exemplary MADN scenario is shown. In this example, a call is placed to the MADN group 16 from terminal B, which is not part of the MADN group 16. The call is answered by the PSTN terminal A1 of the MADN group 16. The PSTN terminal A1 will place the call on hold, and the IP terminal A2 of the MADN group 16 will retrieve the held call. Subsequently, IP terminal A2 will trigger release of the call.

Again, signaling between the switch 18 and gateway 36 is not illustrated. Those skilled in the art will recognize that the gateway 36 will provide the appropriate conversion and forward the call signaling to the switch 18 as described above.

Initially, terminal B initiates a call to PSTN terminal A1. The switch 18 will send a setup message to the PSTN terminal A1 corresponding to the incoming call (step 600). The gateway 36, in cooperation with the switch 18, will send an admission request message to the gatekeeper 40 (step 602), which will respond with an admission confirmation (step 604). The gateway 36 will in turn send a setup message to the gatekeeper 40 (step 606), which will forward the setup message to the IP terminal A2 (step 608).

The PSTN terminal A1 will send an alerting message back to the switch 18 (step 610) in response to the setup message sent to the PSTN terminal A1. Similarly, the IP terminal A2 will send an alerting message to the gatekeeper 40 in response to the setup message received therefrom (step 612). The gatekeeper 40 will forward the alerting message to the gateway 36 (step 614) and on to the switch 18. At this point, both the PSTN terminal A1 and IP terminal A2 recognize that an incoming call is being placed to the members in the MADN group 16. Assuming that the PSTN terminal A1 answers first (step 616), a connect message is forwarded from PSTN terminal A1 to the switch 18 (step 618). The switch 18 will respond with a connect acknowledgement message to the PSTN terminal A1 (step 620) and by effecting a key hold message from the gateway 36 to the gatekeeper 40 (step 622). The key hold message will be forwarded to the IP terminal A2 (step 624). At this point, terminal B is connected to the PSTN terminal A1, and IP terminal is aware that the call was answered by the PSTN terminal A1 and is still in progress (step 626).

At this point, assume that PSTN terminal A1 places the call with terminal B on hold (step 628). The PSTN terminal A1 will respond to a hold command by sending a hold message to the switch 18 (step 630), which will respond with a hold acknowledgement message to the PSTN terminal A1 (step 632). The switch 18 will cause the gateway 36 to send a notify message to the gatekeeper 40 (step 634), which will forward the notify message to IP terminal A2 (step 636). The notify message informs the IP terminal A2 (as well as any other members of the MADN group 16, including PSTN terminal A1, as shown in step 638) that the call has been placed on hold. If IP terminal A2 is instructed to retrieve the call (step 640), IP terminal A2 will send a retrieve message to the gatekeeper 40 (step 642), which will forward the retrieve message to the gateway 36 (step 644). In response to the retrieve messages, the PSTN 12, and particularly the gateway 36, will send a retrieve acknowledgement message in response to the retrieve message to the gatekeeper 40 (step 646), which will forward the retrieve acknowledgement message to IP terminal A2 (step 648). The retrieve message will instruct the PSTN 12 to connect IP terminal A2 to terminal B. In order to keep the other MADN members informed, the switch 18 will send a notify message to the PSTN terminal A1 to indicate the status of the call (step 650). At this point, IP terminal A2 is connected to terminal B (step 652).

Next, assume that IP terminal A2 is instructed to release the call (step 654). The IP terminal A2 will initiate a disconnect message to the gatekeeper 40 (step 656), which will forward the disconnect message to the gateway 36 (step 658). In response, the PSTN 12, through the gateway 36, will send a release complete message to the IP terminal A2 through the gatekeeper 40 (steps 660 and 662) to complete the two-step release. In order to keep other MADN members informed, the switch 18 will also send a release complete message to the PSTN terminal A1 (step 664).

Figure 10:
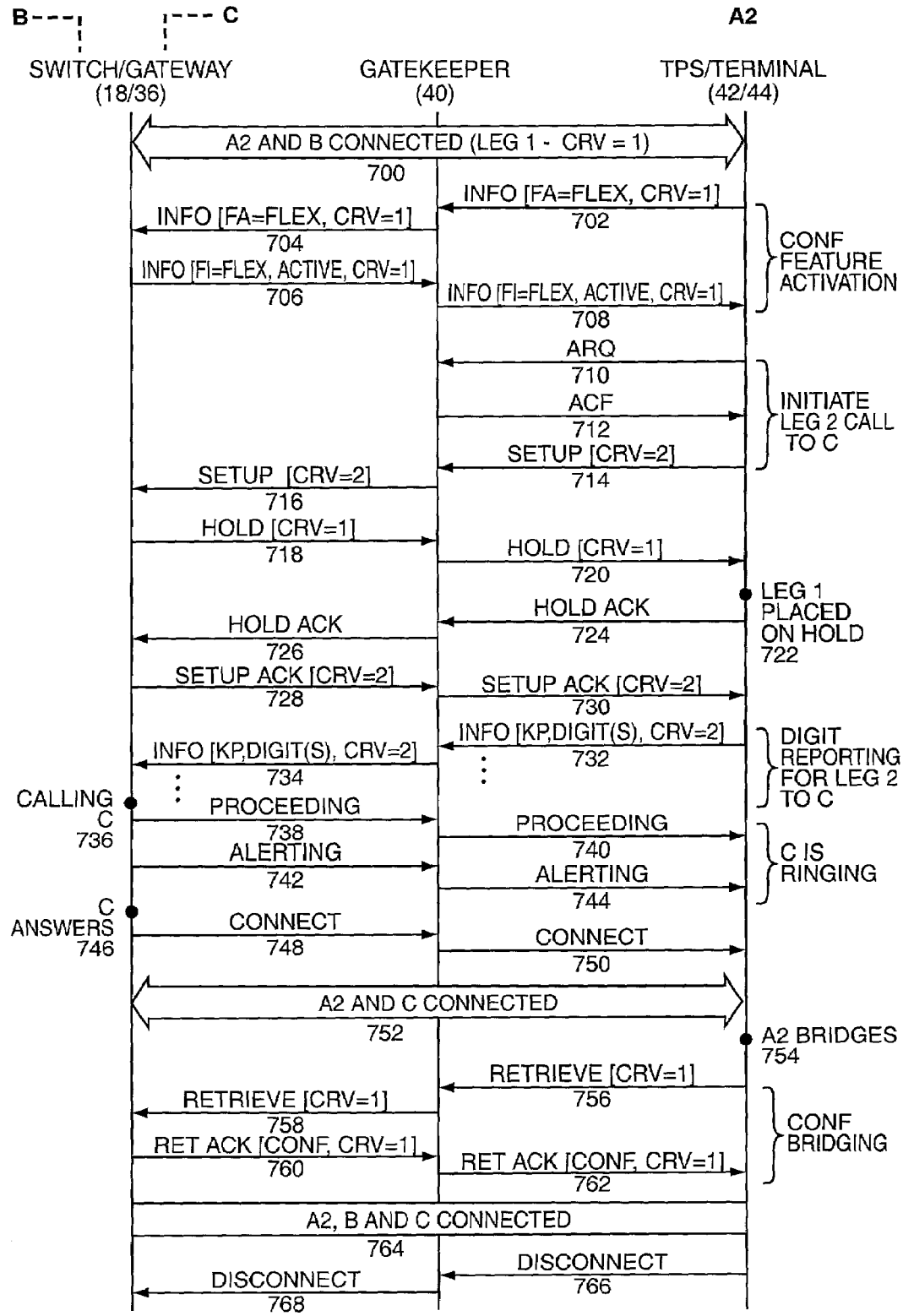
FIG. 10 is a call flow diagram outlining an exemplary call flow in a third MADN call scenario.

FIG. 10 shows yet another related scenario. The call flow outlines the setup and release of a flex or conference call. In general, it is assumed that IP terminal A2 is part of a MADN group 16 and is engaged in a call with terminal B, which is not part of the MADN group 16. During the call, IP terminal A2 is instructed to conference in terminal C, which is also not part of the MADN group 16. The call flow between the PSTN 12 and terminals B and C is not shown in order to better clarify the functionality of the present invention. Those skilled in the art will recognize and understand the traditional call processing provided, in addition to that disclosed, to terminate and release calls with terminals B and C.

As noted, IP terminal A2 and terminal B are engaged in a call. For the purposes of example, this call is the first leg (LEG 1) of a conference call and has a call reference value (CRV) of 1 (step 700). Assuming that IP terminal A2 is instructed to activate a conference feature, the IP terminal A2 will send an information (INFO) message (step 702). The INFO message will identify a feature activator (FA) corresponding to a flex or conference call, as well as the call reference value, which is 1 for LEG 1 of the conference call. The gatekeeper 40 will forward the INFO message to the gateway 36 for processing by the PSTN 12 (step 704). The gateway 36 will respond with an INFO message identifying a feature indicator (FI) (step 706). The gatekeeper 40 will receive the INFO message and forward it to the IP terminal A2 (step 708). Notably, the PSTN 12 will receive indication of the activation of a call conference feature from the gateway 36, as if it were a standard PSTN terminal 20, and will respond to that request accordingly. The response is processed by the gateway 36 and sent to the gatekeeper 40 corresponding to the IP terminal A2.

In response to the returned INFO message, the IP terminal A2 will initiate the second leg (LEG 2) of the call by initiating a call to terminal C. The call is initiated by sending an admission request to the gatekeeper 40 (step 710), which will respond with an admission confirmation message (step 712). The IP terminal A2 will then send a setup message, with a new call reference value (CRV=2) to the gatekeeper 40 (step 714), which will forward the setup message to the PSTN 12 via the gateway 36 (step 716). The PSTN will respond by sending a hold message for the first leg from the gateway 36 to the gatekeeper 40 (step 718). The gatekeeper 40 will forward the hold message, identifying the first leg of the call to the IP terminal A2 (step 720). LEG 1 of the call is placed on hold (step 722), and IP terminal A2 will send a hold acknowledgement message to the gatekeeper 40 (step 724), which will forward the hold acknowledgement message to the PSTN 12 via the gateway 36 (step 726).

In response to the setup message for the second leg of the call (step 714 and 716), the PSTN 12 will send a setup acknowledgement message for the second leg of the call from the gateway 36 to the gatekeeper 40 (step 728). The setup acknowledgement message is forwarded to the IP terminal A2 (step 730).

At this point, the IP terminal A2 may begin reporting digits corresponding to the directory number of terminal C. Notably, information (INFO) messages may be used to report one or more digits being dialed. As such, an INFO message may be used to carry one or all the digits for a directory number. An INFO message generated from IP terminal A2 may identify that a key press (KP) occurred, identify the digits corresponding to the key press, and identify the call reference value. The INFO messages are sent from the IP terminal A2 to the gatekeeper 40 (step 732) and forwarded to the PSTN 12 via the gateway 36 (step 734). After receiving the digits for the second leg of the call, the PSTN 12 will initiate the call to terminal C (step 736) and respond via the gateway 36 with a proceeding message to the gatekeeper 40 (step 738), which forwards the proceeding message to the IP terminal A2 (step 740). The proceeding message indicates that terminal C is being called and is most likely receiving a ringing message. The PSTN 12 will also send an alerting message, via the gateway 36, to the gatekeeper 40 (step 742), which will forward the alerting message to the IP terminal A2 (step 744).

When terminal C answers the incoming call (step 746), the gateway 36 will forward a connect message from the PSTN 12 to the gatekeeper 40 (step 748), which will forward the connect message to the IP terminal A2 (step 750). At this point, IP terminal A2 is connected to terminal C on the second leg of the call (step 752).

IP terminal A2 will then be instructed to bridge the first leg of the call, which was placed on hold, with the second leg of the call (step 754). As such, the IP terminal A2 will send a retrieve message, identifying the first leg of the call, to the gatekeeper 40 (step 756), which will forward the retrieve message to the PSTN 12 via the gateway 36 (step 758). In response, the gateway 36 will send a retrieve acknowledgement message to the gatekeeper 40 (step 760), which will forward the retrieve acknowledgement message to the IP terminal A2 (step 762). Notably, the retrieve acknowledgement message will preferably identify the conference bridging function being supported and the identification of the leg being bridged into the existing connection. At this point, IP terminal A2 is connected to terminals B and C in a conference call (step 764). The IP terminal A2 may end participation in the call by initiating a disconnect message, which is forwarded to the PSTN 12 via the gatekeeper 40 and gateway 36 (steps 766 and 768). Preferably, the two-step disconnect is incorporated as described above.

Figure 11:
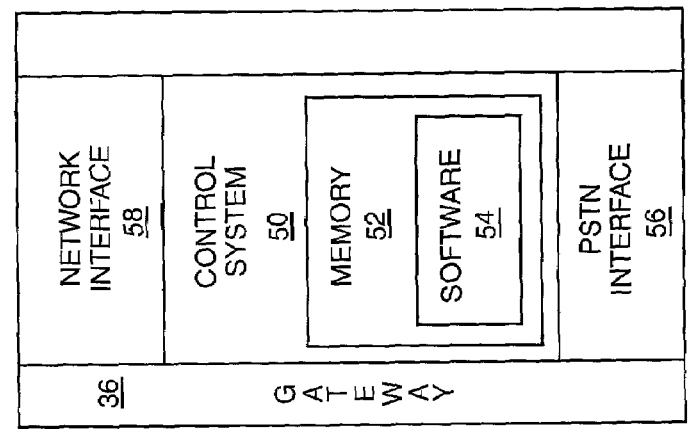
FIG. 11 is a block representation of a gateway according to a preferred embodiment of the present invention.

A breakdown of the basic hardware architecture of each of the primary elements of the present invention follows. A block representation of the gateway 36 is shown in FIG. 11. The gateway 36 will preferably include a control system 50 containing memory 52 and the requisite software 54 and data to facilitate operation of the gateway 36. The control system 50 cooperates to provide a bi-directional interface between a PSTN interface 56 and a packet-switched network interface 58. With the preferred embodiments, the packet-switched network interface 58 may be an Ethernet interface for connecting to LAN 38 or comparable electrical, optical, or wireless interfaces. The PSTN interface 56 is preferably adapted to terminate or emulate an ISDN basic rate interface provided by the switch 18. Preferably, the PSTN interface 56 is capable of providing bi-directional communications of PCM data that is time division multiplexed in standard fashion.

Figure 12:
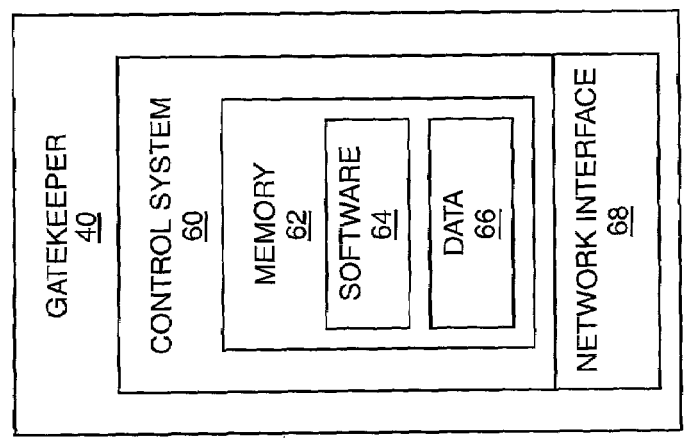
FIG. 12 is a block representation of a gatekeeper according to a preferred embodiment of the present invention.

As illustrated in FIG. 12, the gatekeeper 40 will include a control system 60 having sufficient memory 62 for the requisite software 64 and data 66 controlling operation of the gatekeeper 40. The control system 60 is preferably associated with a packet-switched network interface 68 to facilitate communications over the LAN 38 or like electrical, optical, or wireless network.

Figure 13:
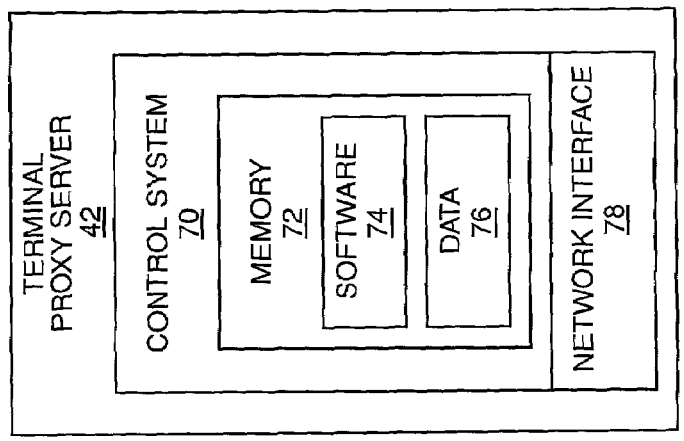
FIG. 13 is a block representation of a terminal proxy server according to a preferred embodiment of the present invention.

A block representation of a TPS 42 is shown in FIG. 13. The TPS 42 will include a control system 70 containing memory 72 sufficient to store the requisite software 74 and data 76 necessary for operation of the TPS 42. The TPS 42 will also include a network interface 78 capable of facilitating packet-switched communications. Notably, the TPS 42 is configured to communicate with and control associated IP terminals 44 in traditional fashion, as well as communicate with the gatekeeper 40 and provide the necessary translations between protocols used to communicate with the IP terminals 44 and those used to communicate with the gatekeeper 40, the gateway 36, or other IP terminals 44 not supported by the TPS 42.

Figure 14:
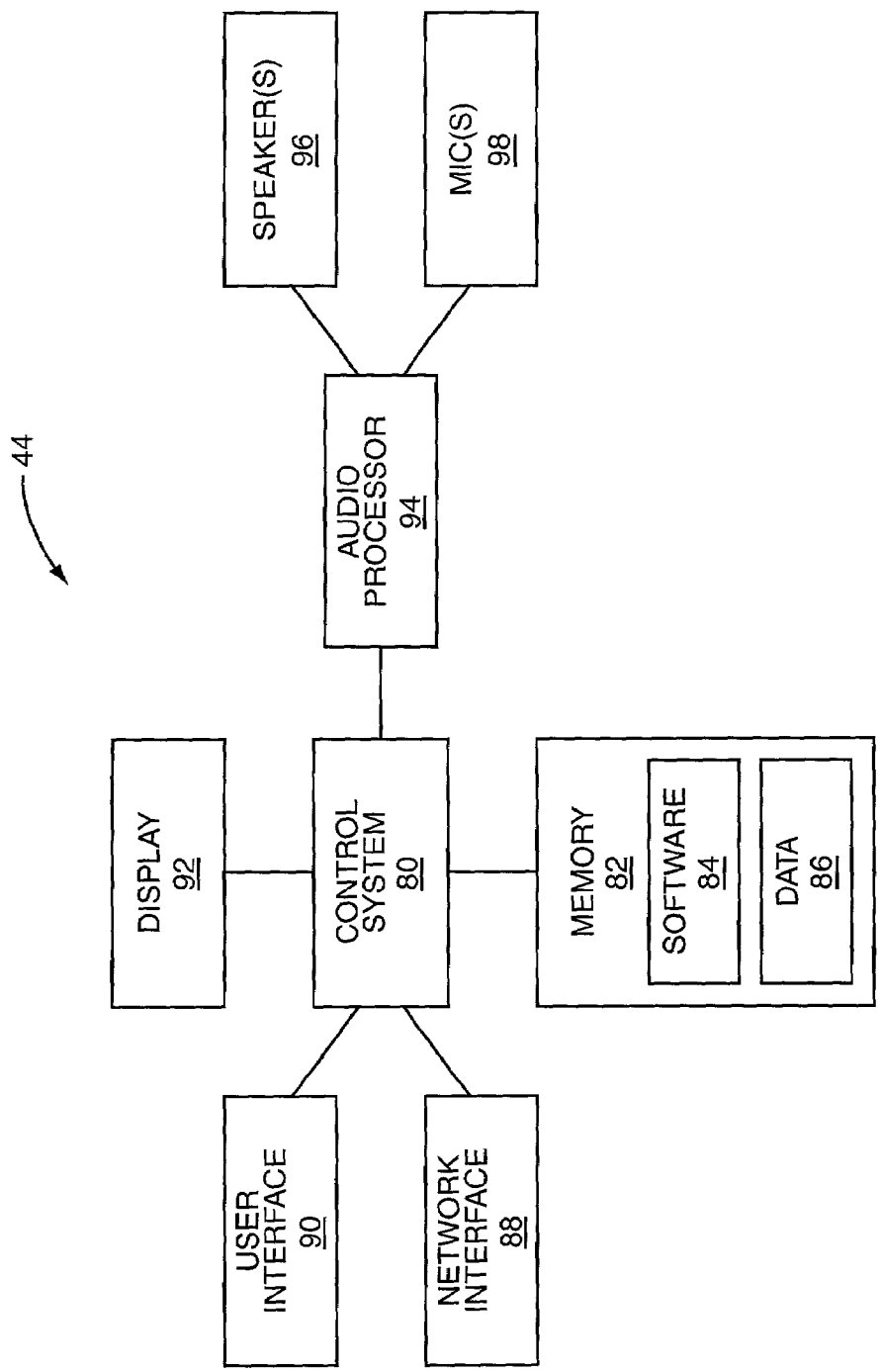
FIG. 14 is a block representation of an IP terminal according to a preferred embodiment of the present invention.

FIG. 14 illustrates a block representation of an IP terminal 44. The IP terminal 44 will typically include a control system 80 associated with sufficient memory 82 to store the requisite software 84 and data 86 necessary for operation. The control system 80 is also associated with a network interface 88 configured to communicate with other packet-switched network devices, such as the gateway 36, gatekeeper 40, and TPS 42, if necessary. The control system 80 will also support a user interface 90 and a display 92, as well as an audio processor 94, capable of processing incoming audio and providing it to speakers 96 as well as receiving incoming audio from microphones 98 for transport over a network.

These components cooperate to form an IP telephone or like terminal supporting voice or media communications. The IP terminal 44 will include sufficient keys, displays, and lights to trigger and respond to the services supported by the PSTN 12.

The concepts of the invention may be implemented as a method and in hardware and software. The software may be embodied in various types of computer readable media, including magnetic and optical mediums. Those skilled in the art will recognize improvements and modifications to the preferred embodiments of the present invention. All such improvements and modifications are considered within the scope of the concepts disclosed herein and the claims that follow.

What is claimed is:

1. A method for supporting a multiple appearance directory number (MADN) group including packet- and circuit-switched terminals, the method comprising:
   a) provisioning a common directory number for the MADN group including a circuit-switched terminal on a public switched telephone network (PSTN) and at least one packet-switched terminal on a packet-switched network;
   b) providing centralized call signaling for the circuit-switched terminal and the at least one packet-switched terminal from the PSTN; and
   c) providing PSTN services to the circuit-switched terminal and the at least one packet-switched terminal via the PSTN.

2. The method of claim 1 wherein the MADN group includes a plurality of packet-switched terminals sharing the common directory number and further comprising sending a status message from one of the plurality of packet-switched terminals or a supporting terminal proxy server to remaining ones of the plurality of packet-switched terminals upon occurrence of a MADN event.

3. The method of claim 2 wherein when originating a call from the one of the plurality of packet-switched terminals, the status message indicates that the one of the plurality of packet-switched terminals is originating the call.

4. The method of claim 2 wherein when an incoming call is directed to the MADN group and answered with the one of the plurality of packet-switched terminals, the status message indicates that the one of the plurality of packet-switched terminals has answered the incoming call.

5. The method of claim 2 wherein when the one of the plurality of packet-switched terminals disconnects from a call, which remains in progress after disconnect, the status message indicates that the one of the plurality of packet-switched terminals has disconnected from the call and that the call remains in progress.

6. The method of claim 1 further comprising, when the at least one packet-switched terminal disconnects from a call:
   a) sending a disconnect message directed to the PSTN from the at least one packet-switched terminal; and
   b) sending a release complete message in response to the disconnect message and directed to the at least one packet-switched terminal from the PSTN, the release complete message including feature information from the PSTN for use by the at least one packet-switched terminal.

7. The method of claim 1 further comprising presenting the at least one packet-switched terminal on the packet-switched network as a PSTN terminal on a virtual telephony loop to the PSTN.

8. The method of claim 7 further comprising associating the at least one packet-switched terminal with a virtual loop identifier identifying the virtual telephony loop.

9. The method of claim 8 further comprising:
   a) presenting the PSTN to a gatekeeper on the packet-switched network as an endpoint on the packet-switched network;
   b) receiving a call signaling message on behalf of the at least one packet-switched terminal including the virtual loop identifier via the gatekeeper on the packet-switched network;
   c) identifying the virtual telephony loop based on the virtual loop identifier; and
   d) sending a corresponding call signaling message to the PSTN.

10. The method of claim 9 further comprising:
    a) receiving a call signaling message directed to the at least one packet-switched terminal from the PSTN via the virtual telephony loop; and
    b) sending a corresponding call signaling message to the gatekeeper for the at least one packet-switched terminal.

11. The method of claim 10 further comprising passing the virtual loop identifier from the PSTN to the gatekeeper with the call signaling message directed to the at least one packet-switched terminal.

12. The method of claim 10 further comprising tunneling information pertaining to at least one of call features or call indicators in certain of the call signaling messages sent between the PSTN and the at least one packet-switched terminal or a terminal proxy server associated with the at least one packet-switched terminal via a gateway connecting the PSTN with the packet-switched network.

13. The method of claim 9 further comprising inserting information pertaining to PSTN features in certain of the call signaling messages sent to the at least one packet-switched terminal or a terminal proxy server associated with the at least one packet-switched terminal via the gatekeeper.

14. The method of claim 9 further comprising sending data associating the virtual loop identifier with a logical identifier for the at least one packet-switched terminal to the gatekeeper.

15. The method of claim 9 further comprising providing protocol conversion between the PSTN and the packet-switched network for call signaling.

16. The method of claim 9 further comprising providing conversion between packetized data in the packet-switched network and pulse code modulated data in the PSTN.

17. A call signaling system for supporting a multiple appearance directory number (MADN) group including packet- and circuit-switched terminals, the system comprising:
    a) a circuit-switched interface supporting a circuit-switched terminal;
    b) a gateway supporting a packet-switched network with at least one packet-switched terminal;
    c) a call signaling system associated with said circuit switched interface and said gateway and adapted to:
       i) provision a common directory number for the MADN group including the circuit-switched terminal and the at least one packet-switched terminal on the packet-switched network;
       ii) provide centralized call signaling for the circuit-switched terminal and the at least one packet-switched terminal; and
       iii) provide public switched telephone network (PSTN) services to the circuit-switched terminal and the at least one packet-switched terminal.

18. The system of claim 17 wherein the MADN group includes a plurality of packet-switched terminals sharing the common directory number, each one of the plurality of packet-switched terminals or a corresponding terminal proxy server configured to send a status message to remaining ones of the plurality of packet-switched terminals upon occurrence of a MADN event.

19. The system of claim 18 wherein when originating a call from the one of the plurality of packet-switched terminals, the status message indicates that the one of the plurality of packet-switched terminals is originating the call.

20. The system of claim 18 wherein when an incoming call is directed to the MADN group and answered with the one of the plurality of packet-switched terminals, the status message indicates that the one of the plurality of packet-switched terminals has answered the incoming call.

21. The system of claim 18 wherein when the one of the plurality of packet-switched terminals disconnects from a call, which remains in progress after disconnect, the status message indicates that the one of the plurality of packet-switched terminals has disconnected from the call and that the call remains in progress.

22. The system of claim 17 wherein the call signaling system is further adapted to, when the at least one packet-switched terminal disconnects from a call:
 a) receive a disconnect message from the at least one packet-switched terminal; and
 b) send a release complete message in response to the disconnect message and directed to the at least one packet-switched terminal, the release complete message including feature information for use by the at least one packet-switched terminal.

23. The system of claim 17 further comprising a gateway adapted to cooperate with said call signaling system to present the at least one packet-switched terminal on the packet-switched network as a PSTN terminal on a virtual telephony loop to the PSTN.

24. The system of claim 23 wherein said call signaling system is further adapted to associate the at least one packet-switched terminal with a virtual loop identifier identifying the virtual telephony loop.

25. The system of claim 24 further comprising a gatekeeper on the packet-switched network and adapted to interact with said gateway and the at least one packet-switched terminal or a terminal proxy server therefor wherein said gateway is configured to:
 a) present the PSTN to said gatekeeper on the packet-switched network as an endpoint on the packet-switched network;
 b) receive a call signaling message including the virtual loop identifier on behalf of the at least one packet-switched terminal;
 c) identify the virtual telephony loop based on the virtual loop identifier; and
 d) send a corresponding call signaling message to the call signaling system.

26. The method of claim 25 wherein the call signaling message includes an integrated services digital network (ISDN) call signaling message and the endpoint is an H.323 endpoint.

27. The method of claim 17 wherein the circuit-switched interface is an integrated service digital network (ISDN) interface and the gateway emulates an ISDN interface wherein the packet-switched terminal appears to the call signaling system as a circuit-switched terminal on an integrated services digital network.

28. A system for supporting a multiple appearance directory number (MADN) group including packet- and circuit-switched terminals, the method comprising:
 a) means for provisioning a common directory number for the MADN group including a circuit-switched terminal on a public switched telephone network (PSTN) and at least one packet-switched terminal on a packet-switched network;
 b) means for providing centralized call signaling for the circuit-switched terminal and the at least one packet-switched terminal from the PSTN; and
 c) means for providing PSTN services to the circuit-switched terminal and the at least one packet-switched terminal via the PSTN.

* * * * *